(12) United States Patent
Bushman et al.

(10) Patent No.: US 8,334,787 B2
(45) Date of Patent: Dec. 18, 2012

(54) GAS METER HAVING ULTRA-SENSITIVE MAGNETIC MATERIAL RETROFITTED ONTO METER DIAL AND METHOD FOR PERFORMING METER RETROFIT

(75) Inventors: Willard Thomas Bushman, Plano, TX (US); William Steven Vogel, San Carlos, CA (US); Robert Gerard Fischette, Oregon City, OR (US); Eric Michael Schoenman, San Francisco, CA (US)

(73) Assignee: Trilliant Networks, Inc., Redwood City, CA (US)

( * ) Notice: Subject to any disclaimer, the term of this patent is extended or adjusted under 35 U.S.C. 154(b) by 907 days.

(21) Appl. No.: 12/258,805

(22) Filed: Oct. 27, 2008

(65) Prior Publication Data

US 2009/0153357 A1 Jun. 18, 2009

Related U.S. Application Data

(60) Provisional application No. 61/000,548, filed on Oct. 25, 2007.

(51) Int. Cl.
*G08B 23/00* (2006.01)
(52) U.S. Cl. .................................. 340/870.02
(58) Field of Classification Search .............. 340/870.02
See application file for complete search history.

(56) References Cited

U.S. PATENT DOCUMENTS

| | | | |
|---|---|---|---|
| 4,132,981 A | 1/1979 | White | 340/203 |
| 4,190,800 A | 2/1980 | Kelly, Jr. et al. | 325/37 |
| 4,204,195 A | 5/1980 | Bogacki | 340/151 |
| 4,254,472 A | 3/1981 | Juengel et al. | 364/900 |
| 4,322,842 A | 3/1982 | Martinez | 370/11 |
| 4,396,915 A | 8/1983 | Farnsworth et al. | 340/870.03 |
| 4,425,628 A | 1/1984 | Bedard et al. | 364/900 |

(Continued)

FOREIGN PATENT DOCUMENTS

EP 0 578 041 B1 11/1999

(Continued)

OTHER PUBLICATIONS

Broch, Josh, et al., "A Performance Comparison of Multi-Hop Wireless Ad Hoc Network Routing Protocols," *Proceedings of the Fourth Annual ACM/IEEE International Conference in Mobile Computing and Networking (MobiCom '98)*, Dallas, Texas, 13 pp., Oct. 25-30, 1998.

(Continued)

*Primary Examiner* — Hal Kaplan
(74) *Attorney, Agent, or Firm* — Dawn-Marie Bey; King & Spalding LLP

(57) ABSTRACT

Device, structure and method for retrofitting a utility meter such as a gas meter with a retrofit module or for new installations to conventional meters so that it can be read remotely and so that retrofit may be accomplished simply by unskilled workers and without damage or alteration of meter. The method for retrofitting a meter of the type having shaft driven dial with dial index pointer and index cover involves removing the meter index cover to access the meter index dial pointer; attaching a magnet to the pointer so that it is carried in orbit around the pointer shaft to which the pointer is attached; and mounting a sensor to the meter adapted to sense the passage of the pointer-mounted magnet and to detect the orbit of index pointer; the attaching of the magnet and the mounting of the sensor being performed without removing the meter dial index assembly.

27 Claims, 16 Drawing Sheets

U.S. PATENT DOCUMENTS

| | | | |
|---|---|---|---|
| 4,638,314 A | 1/1987 | Keller | 340/870.02 |
| 4,644,320 A | 2/1987 | Carr et al. | 340/12.37 |
| 4,749,992 A | 6/1988 | Fitzemeyer et al. | 340/870.02 |
| 4,792,946 A | 12/1988 | Mayo | 370/245 |
| 4,939,726 A | 7/1990 | Flammer et al. | 370/400 |
| 5,007,052 A | 4/1991 | Flammer | 370/389 |
| 5,056,107 A | 10/1991 | Johnson et al. | 375/138 |
| 5,077,753 A | 12/1991 | Grau, Jr. et al. | 375/141 |
| 5,079,768 A | 1/1992 | Flammer | 370/349 |
| 5,115,433 A | 5/1992 | Baran et al. | 370/400 |
| 5,117,422 A | 5/1992 | Hauptschein et al. | 370/255 |
| 5,130,987 A | 7/1992 | Flammer | 370/436 |
| 5,138,615 A | 8/1992 | Lamport et al. | 370/94.3 |
| 5,159,592 A | 10/1992 | Perkins | 370/338 |
| 5,216,623 A | 6/1993 | Barrett et al. | 364/550 |
| 5,276,680 A | 1/1994 | Messenger | 370/311 |
| 5,311,581 A | 5/1994 | Merriam et al. | 379/106.07 |
| 5,400,338 A | 3/1995 | Flammer, III et al. | 370/255 |
| 5,430,729 A | 7/1995 | Rahnema | 370/409 |
| 5,432,507 A | 7/1995 | Mussino et al. | 340/870.03 |
| 5,453,977 A | 9/1995 | Flammer, III et al. | 370/254 |
| 5,459,727 A | 10/1995 | Vannucci | 370/332 |
| 5,463,777 A | 10/1995 | Bialkowski et al. | 1/1 |
| 5,465,398 A | 11/1995 | Flammer | 455/69 |
| 5,467,345 A | 11/1995 | Cutter, Jr. et al. | 370/229 |
| 5,471,469 A | 11/1995 | Flammer, III et al. | 370/346 |
| 5,479,400 A | 12/1995 | Dilworth et al. | 370/331 |
| 5,488,608 A | 1/1996 | Flammer, III | 370/400 |
| 5,515,369 A | 5/1996 | Flammer, III et al. | 370/480 |
| 5,515,509 A | 5/1996 | Rom | 709/228 |
| 5,528,507 A | 6/1996 | McNamara et al. | 700/286 |
| 5,544,036 A | 8/1996 | Brown, Jr. et al. | 364/145 |
| 5,553,094 A | 9/1996 | Johnson et al. | 375/130 |
| 5,570,084 A | 10/1996 | Retter et al. | 370/338 |
| 5,572,438 A | 11/1996 | Ehlers et al. | 700/295 |
| 5,572,528 A | 11/1996 | Shuen | 370/402 |
| 5,596,722 A | 1/1997 | Rahnema | 709/241 |
| 5,608,721 A | 3/1997 | Natarajan et al. | 370/238 |
| 5,608,780 A | 3/1997 | Gerszberg et al. | 455/436 |
| 5,623,495 A | 4/1997 | Eng et al. | 370/397 |
| 5,659,300 A | 8/1997 | Dresselhuys et al. | 340/870.02 |
| 5,673,252 A | 9/1997 | Johnson et al. | 370/449 |
| 5,684,710 A | 11/1997 | Ehlers et al. | 700/293 |
| 5,696,501 A | 12/1997 | Ouellette et al. | 340/870.02 |
| 5,696,695 A | 12/1997 | Ehlers et al. | 700/286 |
| 5,717,718 A | 2/1998 | Rowsell et al. | 375/260 |
| 5,719,564 A | 2/1998 | Sears | 340/870.02 |
| 5,726,644 A | 3/1998 | Jednacz et al. | 340/825.52 |
| 5,727,057 A | 3/1998 | Emery et al. | 379/201.07 |
| 5,737,318 A | 4/1998 | Melnik | 370/254 |
| 5,740,366 A | 4/1998 | Mahany et al. | 709/227 |
| 5,748,104 A | 5/1998 | Argyroudis et al. | 340/870.11 |
| 5,757,783 A | 5/1998 | Eng et al. | 370/315 |
| 5,758,331 A | 5/1998 | Johnson | 705/412 |
| 5,761,083 A | 6/1998 | Brown, Jr. et al. | 364/492 |
| 5,767,790 A | 6/1998 | Jovellana | 340/870.02 |
| 5,774,660 A | 6/1998 | Brendel et al. | 709/201 |
| 5,812,531 A | 9/1998 | Cheung et al. | 370/255 |
| 5,822,309 A | 10/1998 | Ayanoglu et al. | 370/315 |
| 5,844,893 A | 12/1998 | Gollnick et al. | 370/329 |
| 5,874,903 A | 2/1999 | Shuey et al. | 340/870.02 |
| 5,880,677 A | 3/1999 | Lestician | 340/825.06 |
| 5,892,758 A | 4/1999 | Argyroudis | 370/335 |
| 5,894,422 A | 4/1999 | Chasek | 364/528.26 |
| 5,896,097 A | 4/1999 | Cardozo | 340/870.03 |
| 5,896,566 A | 4/1999 | Averbuch et al. | 455/419 |
| 5,898,387 A | 4/1999 | Davis et al. | 340/870.02 |
| 5,898,826 A | 4/1999 | Pierce et al. | 714/4 |
| 5,901,067 A | 5/1999 | Kao et al. | 700/11 |
| 5,903,566 A | 5/1999 | Flammer, III | 370/406 |
| 5,914,672 A | 6/1999 | Glorioso et al. | 340/870.02 |
| 5,914,673 A | 6/1999 | Jennings et al. | 340/870.03 |
| 5,919,247 A | 7/1999 | Van Hoff et al. | 709/217 |
| 5,920,697 A | 7/1999 | Masters et al. | 709/219 |
| 5,926,531 A | 7/1999 | Petite | 379/144.04 |
| 5,933,092 A | 8/1999 | Ouellette et al. | 340/870.02 |
| 5,953,371 A | 9/1999 | Rowsell et al. | 375/220 |
| 5,963,146 A | 10/1999 | Johnson et al. | 340/870.01 |
| 5,963,457 A | 10/1999 | Kanoi et al. | 364/528.26 |
| 5,974,236 A | 10/1999 | Sherman | 709/221 |
| 5,986,574 A | 11/1999 | Colton | 340/870.02 |
| 5,987,011 A | 11/1999 | Toh | 370/331 |
| 5,991,806 A | 11/1999 | McHann, Jr. | 709/224 |
| 6,014,089 A | 1/2000 | Tracy et al. | 340/870.02 |
| 6,018,659 A | 1/2000 | Ayyagari et al. | 455/431 |
| 6,026,133 A | 2/2000 | Sokoler | 375/365 |
| 6,028,522 A | 2/2000 | Petite | 340/641 |
| 6,044,062 A | 3/2000 | Brownrigg et al. | 370/238 |
| 6,058,355 A | 5/2000 | Ahmed et al. | 702/62 |
| 6,061,609 A | 5/2000 | Kanoi et al. | 700/291 |
| 6,073,169 A | 6/2000 | Shuey et al. | 709/217 |
| 6,075,777 A | 6/2000 | Agrawal et al. | 370/329 |
| 6,078,785 A | 6/2000 | Bush | 455/7 |
| 6,084,867 A | 7/2000 | Meier | 370/338 |
| 6,088,659 A | 7/2000 | Kelley et al. | 702/62 |
| 6,097,703 A | 8/2000 | Larsen et al. | 370/254 |
| 6,108,699 A | 8/2000 | Moiin | 709/221 |
| 6,118,269 A | 9/2000 | Davis | 324/110 |
| 6,122,603 A | 9/2000 | Budike, Jr. | 702/182 |
| 6,124,806 A | 9/2000 | Cunningham et al. | 340/870.02 |
| 6,134,587 A | 10/2000 | Okanoue | 709/222 |
| 6,137,423 A | 10/2000 | Glorioso et al. | 340/870.02 |
| 6,150,955 A | 11/2000 | Tracy et al. | 340/870.02 |
| 6,169,979 B1 | 1/2001 | Johnson | 705/412 |
| 6,172,616 B1 | 1/2001 | Johnson et al. | 340/870.12 |
| 6,195,018 B1 | 2/2001 | Ragle et al. | 340/870.01 |
| 6,218,953 B1 | 4/2001 | Petite | 340/641 |
| 6,233,327 B1 | 5/2001 | Petite | 379/155 |
| 6,239,722 B1 | 5/2001 | Colton et al. | 340/870.02 |
| 6,240,080 B1 | 5/2001 | Okanoue et al. | 370/338 |
| 6,246,677 B1 | 6/2001 | Nap et al. | 370/346 |
| 6,246,689 B1 | 6/2001 | Shavitt | 370/406 |
| 6,249,516 B1 | 6/2001 | Brownrigg et al. | 370/338 |
| 6,298,053 B1 | 10/2001 | Flammer, III et al. | 370/349 |
| 6,300,881 B1 | 10/2001 | Yee et al. | 340/870.02 |
| 6,304,556 B1 | 10/2001 | Haas | 370/254 |
| 6,311,105 B1 | 10/2001 | Budike, Jr. | 700/291 |
| 6,338,087 B1 | 1/2002 | Okanoue | 709/222 |
| 6,362,745 B1 | 3/2002 | Davis | 340/637 |
| 6,363,057 B1 | 3/2002 | Ardalan et al. | 370/252 |
| 6,366,217 B1 | 4/2002 | Cunningham et al. | 340/870.31 |
| 6,369,719 B1 | 4/2002 | Tracy et al. | 340/870.02 |
| 6,369,769 B1 | 4/2002 | Nap et al. | 343/719 |
| 6,373,399 B1 | 4/2002 | Johnson et al. | 340/870.11 |
| 6,396,839 B1 | 5/2002 | Ardalan et al. | 370/401 |
| 6,400,949 B1 | 6/2002 | Bielefeld et al. | 455/434 |
| 6,407,991 B1 | 6/2002 | Meier | 370/338 |
| 6,415,330 B1 | 7/2002 | Okanoue | 709/245 |
| 6,430,268 B1 | 8/2002 | Petite | 379/39 |
| 6,437,692 B1 | 8/2002 | Petite et al. | 340/540 |
| 6,457,054 B1 | 9/2002 | Bakshi | 709/227 |
| 6,480,497 B1 | 11/2002 | Flammer, III et al. | 370/400 |
| 6,480,505 B1 | 11/2002 | Johansson et al. | 370/449 |
| 6,492,910 B1 | 12/2002 | Ragle et al. | 340/870.02 |
| 6,509,841 B1 | 1/2003 | Colton et al. | 340/870.11 |
| 6,522,974 B2 | 2/2003 | Sitton | 702/17 |
| 6,535,498 B1 | 3/2003 | Larsson et al. | 370/338 |
| 6,538,577 B1 | 3/2003 | Ehrke et al. | 340/870.02 |
| 6,553,355 B1 | 4/2003 | Arnoux et al. | 706/13 |
| 6,556,830 B1 | 4/2003 | Lenzo | 455/450 |
| 6,577,671 B1 | 6/2003 | Vimpari | 375/146 |
| 6,606,708 B1 | 8/2003 | Devine et al. | 726/8 |
| 6,618,578 B1 | 9/2003 | Petite | 455/92 |
| 6,618,772 B1 | 9/2003 | Kao et al. | 710/15 |
| 6,628,764 B1 | 9/2003 | Petite | 379/106.01 |
| 6,633,823 B2 | 10/2003 | Bartone et al. | 702/57 |
| 6,636,894 B1 | 10/2003 | Short et al. | 709/225 |
| 6,650,249 B2 | 11/2003 | Meyer et al. | 340/870.28 |
| 6,653,945 B2 | 11/2003 | Johnson et al. | 340/870.02 |
| 6,657,552 B2 | 12/2003 | Belski et al. | 340/870.02 |
| 6,665,620 B1 | 12/2003 | Burns et al. | 702/62 |
| 6,671,635 B1 | 12/2003 | Forth et al. | 702/61 |
| 6,681,110 B1 | 1/2004 | Crookham et al. | 455/420 |
| 6,681,154 B2 | 1/2004 | Nierlich et al. | 700/186 |
| 6,684,245 B1 | 1/2004 | Shuey et al. | 709/223 |
| 6,687,901 B1 | 2/2004 | Imamatsu | 717/173 |
| 6,691,173 B2 | 2/2004 | Morris et al. | 709/249 |

| Patent No. | Date | Inventor | Class |
|---|---|---|---|
| 6,697,331 B1 | 2/2004 | Riihinen et al. | 370/236 |
| 6,710,721 B1 | 3/2004 | Holowick | 340/870.02 |
| 6,711,166 B1 | 3/2004 | Amir et al. | 370/395.1 |
| 6,711,409 B1 | 3/2004 | Zavgren, Jr. et al. | 455/445 |
| 6,711,512 B2 | 3/2004 | Noh | 702/65 |
| 6,714,787 B2 | 3/2004 | Reed et al. | 455/445 |
| 6,718,137 B1 | 4/2004 | Chin | 398/3 |
| 6,725,281 B1 | 4/2004 | Zintel et al. | 719/318 |
| 6,728,514 B2 | 4/2004 | Bandeira et al. | 455/13.1 |
| 6,747,557 B1 | 6/2004 | Petite et al. | 340/540 |
| 6,747,981 B2 | 6/2004 | Ardalan et al. | 370/401 |
| 6,751,445 B2 | 6/2004 | Kasperkovitz et al. | 455/76 |
| 6,751,455 B1 | 6/2004 | Acampora | 455/414.1 |
| 6,751,672 B1 | 6/2004 | Khalil et al. | 709/230 |
| 6,772,052 B1 | 8/2004 | Amundsen et al. | 700/291 |
| 6,775,258 B1 | 8/2004 | van Valkenburg et al. | 370/338 |
| 6,778,099 B1 | 8/2004 | Meyer et al. | 340/870.02 |
| 6,785,592 B1 | 8/2004 | Smith et al. | 700/291 |
| 6,798,352 B2 | 9/2004 | Holowick | 340/870.02 |
| 6,801,865 B2 | 10/2004 | Gilgenbach et al. | 702/61 |
| 6,826,620 B1 | 11/2004 | Mawhinney et al. | 709/235 |
| 6,829,216 B1 | 12/2004 | Nakata | 370/228 |
| 6,829,347 B1 | 12/2004 | Odiaka | 379/220.01 |
| 6,831,921 B2 | 12/2004 | Higgins | 370/401 |
| 6,836,737 B2 | 12/2004 | Petite et al. | 702/62 |
| 6,839,775 B1 | 1/2005 | Kao et al. | 710/15 |
| 6,842,706 B1 | 1/2005 | Baraty | 702/61 |
| 6,845,091 B2 | 1/2005 | Ogier et al. | 370/338 |
| 6,859,186 B2 | 2/2005 | Lizalek et al. | 343/767 |
| 6,865,185 B1 | 3/2005 | Patel et al. | 370/412 |
| 6,882,635 B2 | 4/2005 | Eitan et al. | 370/338 |
| 6,885,309 B1 | 4/2005 | Van Heteren | 340/870.11 |
| 6,891,838 B1 | 5/2005 | Petite et al. | 370/401 |
| 6,900,738 B2 | 5/2005 | Crichlow | 340/870.02 |
| 6,904,025 B1 | 6/2005 | Madour et al. | 370/328 |
| 6,904,385 B1 | 6/2005 | Budike, Jr. | 702/182 |
| 6,909,705 B1 | 6/2005 | Lee et al. | 370/338 |
| 6,914,533 B2 | 7/2005 | Petite | 340/628 |
| 6,914,893 B2 | 7/2005 | Petite | 370/256 |
| 6,946,972 B2 | 9/2005 | Mueller et al. | 340/870.02 |
| 6,954,814 B1 | 10/2005 | Leach | 710/305 |
| 6,963,285 B2 | 11/2005 | Fischer et al. | 340/635 |
| 6,967,452 B2 | 11/2005 | Aiso et al. | 318/466 |
| 6,970,434 B1 | 11/2005 | Mahany et al. | 370/256 |
| 6,970,771 B1 | 11/2005 | Preiss et al. | 700/286 |
| 6,975,613 B1 | 12/2005 | Johansson | 370/338 |
| 6,980,973 B1 | 12/2005 | Karpenko | 705/412 |
| 6,982,651 B2 | 1/2006 | Fischer | 340/870.02 |
| 6,985,087 B2 | 1/2006 | Soliman | 340/870.02 |
| 6,995,666 B1 | 2/2006 | Luttrell | 340/539.1 |
| 6,999,441 B2 | 2/2006 | Flammer, III et al. | 370/337 |
| 7,009,379 B2 | 3/2006 | Ramirez | 324/142 |
| 7,009,493 B2 | 3/2006 | Howard et al. | 340/7.1 |
| 7,010,363 B2 | 3/2006 | Donnelly et al. | 700/19 |
| 7,016,336 B2 | 3/2006 | Sorensen | 370/351 |
| 7,020,701 B1 | 3/2006 | Gelvin et al. | 709/224 |
| 7,042,368 B2 | 5/2006 | Patterson et al. | 340/870.29 |
| 7,046,682 B2 | 5/2006 | Carpenter et al. | 370/401 |
| 7,053,767 B2 | 5/2006 | Petite et al. | 340/531 |
| 7,053,853 B2 | 5/2006 | Merenda et al. | 343/820 |
| 7,054,271 B2 | 5/2006 | Brownrigg et al. | 370/238 |
| 7,062,361 B1 | 6/2006 | Lane | 700/286 |
| 7,064,679 B2 | 6/2006 | Ehrke et al. | 340/870.02 |
| 7,072,945 B1 | 7/2006 | Nieminen et al. | 709/217 |
| 7,079,810 B2 | 7/2006 | Petite et al. | 455/41.2 |
| 7,089,089 B2 | 8/2006 | Cumming et al. | 700/295 |
| 7,102,533 B2 | 9/2006 | Kim | 340/870.02 |
| 7,103,086 B2 | 9/2006 | Steed et al. | 375/132 |
| 7,103,511 B2 | 9/2006 | Petite | 702/188 |
| 7,106,044 B1 | 9/2006 | Lee, Jr. et al. | 324/110 |
| 7,119,713 B2 | 10/2006 | Shuey et al. | 340/870.02 |
| 7,126,494 B2 | 10/2006 | Ardalan et al. | 340/870.02 |
| 7,135,850 B2 | 11/2006 | Ramirez | 324/142 |
| 7,135,956 B2 | 11/2006 | Bartone et al. | 340/3.9 |
| 7,137,550 B1 | 11/2006 | Petite | 235/379 |
| 7,143,204 B1 | 11/2006 | Kao et al. | 710/18 |
| 7,145,474 B2 | 12/2006 | Shuey et al. | 340/870.03 |
| 7,170,425 B2 | 1/2007 | Christopher et al. | 340/870.02 |
| 7,174,260 B2 | 2/2007 | Tuff et al. | 702/61 |
| 7,185,131 B2 | 2/2007 | Leach | 710/305 |
| 7,188,003 B2 | 3/2007 | Ransom et al. | 700/286 |
| 7,197,046 B1 | 3/2007 | Hariharasubrahmanian | 370/466 |
| 7,200,633 B2 | 4/2007 | Sekiguchi et al. | 709/203 |
| 7,209,840 B2 | 4/2007 | Petite et al. | 702/62 |
| 7,215,926 B2 | 5/2007 | Corbett et al. | 455/41.2 |
| 7,222,111 B1 | 5/2007 | Budike, Jr. | 705/412 |
| 7,230,544 B2 | 6/2007 | Van Heteren | 340/870.03 |
| 7,230,931 B2 | 6/2007 | Struhsaker | 370/280 |
| 7,231,482 B2 | 6/2007 | Leach | 710/305 |
| 7,245,938 B2 | 7/2007 | Sobczak et al. | 455/562.1 |
| 7,248,181 B2 | 7/2007 | Patterson et al. | 340/870.03 |
| 7,248,861 B2 | 7/2007 | Lazaridis et al. | 455/414.1 |
| 7,250,874 B2 | 7/2007 | Mueller et al. | 340/870.06 |
| 7,251,570 B2 | 7/2007 | Hancock et al. | 702/57 |
| 7,263,073 B2 | 8/2007 | Petite et al. | 370/278 |
| 7,271,735 B2 | 9/2007 | Rogai | 340/870.02 |
| 7,274,305 B1 | 9/2007 | Luttrell | 340/870.02 |
| 7,274,975 B2 | 9/2007 | Miller | 700/295 |
| 7,277,027 B2 | 10/2007 | Ehrke et al. | 340/870.12 |
| 7,277,967 B2 | 10/2007 | Kao et al. | 710/18 |
| 7,289,887 B2 | 10/2007 | Rodgers | 700/295 |
| 7,295,128 B2 | 11/2007 | Petite | 340/628 |
| 7,301,476 B2 | 11/2007 | Shuey et al. | 340/870.03 |
| 7,304,587 B2 | 12/2007 | Boaz | 340/870.02 |
| 7,308,370 B2 | 12/2007 | Mason, Jr. et al. | 702/65 |
| 7,312,721 B2 | 12/2007 | Mason, Jr. et al. | 340/870.02 |
| 7,315,257 B2 | 1/2008 | Patterson et al. | 340/870.02 |
| 7,317,404 B2 | 1/2008 | Cumeralto et al. | 340/870.02 |
| 7,321,316 B2 | 1/2008 | Hancock et al. | 340/870.02 |
| 7,324,453 B2 | 1/2008 | Wu et al. | 370/238 |
| 7,327,998 B2 | 2/2008 | Kumar et al. | 455/405 |
| 7,346,463 B2 | 3/2008 | Petite et al. | 702/62 |
| 7,348,769 B2 | 3/2008 | Ramirez | 324/158.1 |
| 7,349,766 B2 | 3/2008 | Rodgers | 700/295 |
| 7,362,709 B1 | 4/2008 | Hui et al. | 370/237 |
| 7,366,113 B1 | 4/2008 | Chandra et al. | 370/255 |
| 7,366,191 B2 | 4/2008 | Higashiyama | 370/406 |
| 7,379,981 B2 | 5/2008 | Elliott et al. | 709/220 |
| 7,397,907 B2 | 7/2008 | Petite | 379/155 |
| 7,406,298 B2 | 7/2008 | Luglio et al. | 455/90.3 |
| 7,411,964 B2 | 8/2008 | Suemura | 370/400 |
| 7,427,927 B2 | 9/2008 | Borleske et al. | 340/870.02 |
| 7,451,019 B2 | 11/2008 | Rodgers | 700/295 |
| 7,457,273 B2 | 11/2008 | Nakanishi et al. | 370/338 |
| 7,468,661 B2 | 12/2008 | Petite et al. | 340/540 |
| 7,487,282 B2 | 2/2009 | Leach | 710/305 |
| 7,495,578 B2 | 2/2009 | Borleske | 340/870.02 |
| 7,498,873 B2 | 3/2009 | Opshaug et al. | 329/315 |
| 7,505,453 B2 | 3/2009 | Carpenter et al. | 370/352 |
| 7,512,234 B2 | 3/2009 | McDonnell et al. | 380/247 |
| 7,515,571 B2 | 4/2009 | Kwon et al. | 370/338 |
| 7,516,106 B2 | 4/2009 | Ehlers et al. | 705/412 |
| 7,522,540 B1 | 4/2009 | Maufer | 370/254 |
| 7,522,639 B1 | 4/2009 | Katz | 370/503 |
| 7,539,151 B2 | 5/2009 | Demirhan et al. | 370/254 |
| 7,545,285 B2 | 6/2009 | Shuey et al. | 340/870.02 |
| 7,546,595 B1 | 6/2009 | Wickham et al. | 717/168 |
| 7,548,826 B2 | 6/2009 | Witter et al. | 702/115 |
| 7,548,907 B2 | 6/2009 | Wall et al. | 1/1 |
| 7,554,941 B2 | 6/2009 | Ratiu et al. | 370/328 |
| 7,562,024 B2 | 7/2009 | Brooks et al. | 705/1.1 |
| 7,571,865 B2 | 8/2009 | Nicodem et al. | 236/51 |
| 7,586,420 B2 | 9/2009 | Fischer et al. | 340/635 |
| 7,599,665 B2 | 10/2009 | Sinivaara | 455/67.16 |
| 7,602,747 B2 | 10/2009 | Maksymczuk et al. | 370/331 |
| 7,609,673 B2 | 10/2009 | Bergenlid et al. | 370/329 |
| 7,613,147 B2 | 11/2009 | Bergenlid et al. | 370/329 |
| 7,623,043 B2 | 11/2009 | Mizra et al. | 340/870.02 |
| 7,626,967 B2 | 12/2009 | Yarvis et al. | 370/338 |
| 7,650,425 B2 | 1/2010 | Davis et al. | 709/238 |
| 7,676,231 B2 | 3/2010 | Demirhan et al. | 455/452.1 |
| 7,680,041 B2 | 3/2010 | Johansen | 370/230 |
| 7,729,496 B2 | 6/2010 | Hacigumus | 380/277 |
| 7,733,224 B2 | 6/2010 | Tran | 340/540 |
| 7,743,224 B2 | 6/2010 | Wang | 711/154 |
| 7,756,538 B2 | 7/2010 | Bonta et al. | 455/517 |
| 7,788,491 B1 | 8/2010 | Dawson | 713/168 |
| 7,802,245 B2 | 9/2010 | Sonnier et al. | 717/171 |

| | | | | | | |
|---|---|---|---|---|---|---|
| 7,814,322 B2 | 10/2010 | Gurevich et al. ............. 713/171 | 2006/0077906 A1 | 4/2006 | Maegawa et al. ............ 370/254 |
| 7,818,758 B2 | 10/2010 | de Bonet et al. .............. 719/328 | 2006/0087993 A1 | 4/2006 | Sengupta et al. ............. 370/310 |
| 7,847,706 B1 | 12/2010 | Ross et al. ................. 340/12.52 | 2006/0098576 A1 | 5/2006 | Brownrigg et al. ........... 370/238 |
| 8,051,415 B2 | 11/2011 | Suzuki ........................ 717/168 | 2006/0098604 A1 | 5/2006 | Flammer, III et al. ........ 370/337 |
| 2001/0005368 A1 | 6/2001 | Rune ........................... 370/390 | 2006/0111111 A1 | 5/2006 | Ovadia .......................... 455/439 |
| 2001/0010032 A1 | 7/2001 | Ehlers et al. ................... 702/62 | 2006/0130053 A1 | 6/2006 | Buljore et al. ................. 717/173 |
| 2001/0038342 A1 | 11/2001 | Foote ......................... 340/870.02 | 2006/0140135 A1 | 6/2006 | Bonta et al. ................... 370/254 |
| 2001/0046879 A1 | 11/2001 | Schramm et al. ............. 455/525 | 2006/0146717 A1 | 7/2006 | Conner et al. ................. 370/238 |
| 2002/0012358 A1 | 1/2002 | Sato .............................. 370/466 | 2006/0158347 A1 | 7/2006 | Roche et al. ............. 340/870.02 |
| 2002/0013679 A1 | 1/2002 | Petite ............................ 702/188 | 2006/0161310 A1 | 7/2006 | Lal .................................. 700/295 |
| 2002/0031101 A1 | 3/2002 | Petite et al. ................... 370/310 | 2006/0167784 A1 | 7/2006 | Hoffberg ......................... 705/37 |
| 2002/0051269 A1 | 5/2002 | Margalit et al. ............... 398/126 | 2006/0184288 A1 | 8/2006 | Rodgers ......................... 700/295 |
| 2002/0066095 A1 | 5/2002 | Yu ................................. 717/173 | 2006/0215583 A1 | 9/2006 | Castagnoli ..................... 370/254 |
| 2002/0110118 A1 | 8/2002 | Foley ............................ 370/352 | 2006/0215673 A1 | 9/2006 | Olvera-Hernandez ........ 370/406 |
| 2002/0114303 A1 | 8/2002 | Crosbie et al. ................ 370/338 | 2006/0217936 A1 | 9/2006 | Mason et al. .................. 702/188 |
| 2002/0120569 A1 | 8/2002 | Day ................................. 705/40 | 2006/0230276 A1 | 10/2006 | Nochta ............................ 713/176 |
| 2002/0174354 A1 | 11/2002 | Bel et al. ....................... 713/193 | 2006/0271244 A1 | 11/2006 | Cumming et al. ............. 700/291 |
| 2002/0186619 A1 | 12/2002 | Reeves et al. ................... 368/47 | 2006/0271678 A1 | 11/2006 | Jessup et al. ................... 709/224 |
| 2003/0001640 A1 | 1/2003 | Lao et al. ...................... 327/165 | 2007/0001868 A1 | 1/2007 | Boaz ....................... 340/870.02 |
| 2003/0001754 A1 | 1/2003 | Johnson et al. .......... 340/870.02 | 2007/0013547 A1 | 1/2007 | Boaz ....................... 340/870.02 |
| 2003/0014633 A1 | 1/2003 | Gruber .......................... 713/170 | 2007/0019598 A1 | 1/2007 | Prehofer ........................ 370/338 |
| 2003/0033394 A1 | 2/2003 | Stine ............................. 709/222 | 2007/0036353 A1 | 2/2007 | Reznik et al. ................... 380/30 |
| 2003/0037268 A1 | 2/2003 | Kistler .......................... 713/310 | 2007/0057767 A1 | 3/2007 | Sun et al. ...................... 340/7.35 |
| 2003/0050737 A1 | 3/2003 | Osann ........................... 700/276 | 2007/0060147 A1 | 3/2007 | Shin et al. ..................... 455/445 |
| 2003/0112822 A1 | 6/2003 | Hong et al. ................... 370/469 | 2007/0063866 A1 | 3/2007 | Webb ....................... 340/870.02 |
| 2003/0117966 A1 | 6/2003 | Chen ............................. 370/255 | 2007/0063868 A1 | 3/2007 | Borleske ................. 340/870.03 |
| 2003/0122686 A1 | 7/2003 | Ehrke et al. .............. 340/870.02 | 2007/0085700 A1 | 4/2007 | Walters et al. ........... 340/870.02 |
| 2003/0123481 A1 | 7/2003 | Neale et al. ................... 370/466 | 2007/0087756 A1 | 4/2007 | Hoffberg ....................... 455/450 |
| 2003/0156715 A1 | 8/2003 | Reeds, III et al. .............. 380/37 | 2007/0089110 A1 | 4/2007 | Li .................................. 717/178 |
| 2003/0207697 A1 | 11/2003 | Shpak .......................... 455/524 | 2007/0101442 A1 | 5/2007 | Bondurant ..................... 726/34 |
| 2003/0229900 A1 | 12/2003 | Reisman ......................... 725/87 | 2007/0103324 A1 | 5/2007 | Kosuge et al. ................ 340/618 |
| 2003/0233201 A1 | 12/2003 | Horst et al. ...................... 702/62 | 2007/0109121 A1 | 5/2007 | Cohen ...................... 340/539.26 |
| 2004/0008663 A1 | 1/2004 | Srikrishna et al. ............ 370/351 | 2007/0110024 A1 | 5/2007 | Meier ............................ 370/351 |
| 2004/0031030 A1 | 2/2004 | Kidder et al. ................. 717/172 | 2007/0120705 A1 | 5/2007 | Kiiskila et al. ............ 340/870.02 |
| 2004/0034773 A1 | 2/2004 | Balabine et al. .............. 713/168 | 2007/0136817 A1 | 6/2007 | Nguyen ............................ 726/26 |
| 2004/0039817 A1 | 2/2004 | Lee et al. ...................... 709/225 | 2007/0139220 A1 | 6/2007 | Mirza et al. .............. 340/870.02 |
| 2004/0056775 A1 | 3/2004 | Crookham et al. ............ 340/825 | 2007/0143046 A1 | 6/2007 | Budike, Jr. ...................... 702/62 |
| 2004/0066310 A1 | 4/2004 | Ehrke et al. .............. 340/870.02 | 2007/0147268 A1 | 6/2007 | Kelley et al. .................. 370/254 |
| 2004/0077341 A1 | 4/2004 | Chandranmenon et al. .. 455/418 | 2007/0169074 A1 | 7/2007 | Koo et al. ..................... 717/168 |
| 2004/0081086 A1 | 4/2004 | Hippelainen et al. ......... 370/227 | 2007/0169075 A1 | 7/2007 | Lill et al. ...................... 717/168 |
| 2004/0082203 A1 | 4/2004 | Logvinov et al. ............... 439/10 | 2007/0169080 A1 | 7/2007 | Friedman ..................... 717/168 |
| 2004/0100953 A1 | 5/2004 | Chen et al. .................... 370/389 | 2007/0174467 A1 | 7/2007 | Ballou, Jr. et al. ............ 709/227 |
| 2004/0113810 A1 | 6/2004 | Mason, Jr. et al. ....... 340/870.02 | 2007/0177538 A1 | 8/2007 | Christensen et al. .......... 370/328 |
| 2004/0117788 A1 | 6/2004 | Karaoguz et al. ............. 717/177 | 2007/0177576 A1 | 8/2007 | Johansen et al. .............. 370/351 |
| 2004/0125776 A1 | 7/2004 | Haugli et al. ................. 370/338 | 2007/0177613 A1 | 8/2007 | Shorty et al. .................. 370/401 |
| 2004/0138787 A1 | 7/2004 | Ransom et al. ............... 700/295 | 2007/0189249 A1 | 8/2007 | Gurevich et al. .............. 370/338 |
| 2004/0140908 A1 | 7/2004 | Gladwin et al. .......... 340/870.02 | 2007/0200729 A1 | 8/2007 | Borleske et al. .......... 340/870.02 |
| 2004/0157613 A1 | 8/2004 | Steer et al. .................... 455/446 | 2007/0201504 A1 | 8/2007 | Christensen et al. .......... 370/437 |
| 2004/0183687 A1 | 9/2004 | Petite et al. ................... 340/601 | 2007/0204009 A1 | 8/2007 | Shorty et al. .................. 709/218 |
| 2004/0185845 A1 | 9/2004 | Abhishek et al. ........... 455/422.1 | 2007/0205915 A1 | 9/2007 | Shuey et al. .............. 340/870.02 |
| 2004/0193329 A1 | 9/2004 | Ransom et al. ............... 700/286 | 2007/0206503 A1 | 9/2007 | Gong et al. .................... 370/238 |
| 2004/0210544 A1 | 10/2004 | Shuey et al. .................. 705/412 | 2007/0206521 A1 | 9/2007 | Osaje ............................ 370/315 |
| 2004/0268142 A1 | 12/2004 | Karjala et al. ................... 726/15 | 2007/0207811 A1 | 9/2007 | Das et al. ...................... 455/450 |
| 2005/0026569 A1 | 2/2005 | Lim et al. ....................... 455/73 | 2007/0210933 A1 | 9/2007 | Leach ...................... 340/870.02 |
| 2005/0027859 A1 | 2/2005 | Alvisi et al. ................... 709/224 | 2007/0211636 A1 | 9/2007 | Bellur et al. ................... 370/238 |
| 2005/0030968 A1 | 2/2005 | Rich et al. ..................... 370/449 | 2007/0239477 A1 | 10/2007 | Budike, Jr. ..................... 705/412 |
| 2005/0033967 A1 | 2/2005 | Morino et al. ................. 713/182 | 2007/0248047 A1 | 10/2007 | Shorty et al. .................. 370/329 |
| 2005/0055432 A1 | 3/2005 | Rodgers ........................ 709/223 | 2007/0257813 A1 | 11/2007 | Vaswani et al. .......... 340/870.02 |
| 2005/0058144 A1 | 3/2005 | Ayyagari et al. .............. 370/401 | 2007/0258508 A1 | 11/2007 | Werb et al. .................... 375/140 |
| 2005/0065742 A1 | 3/2005 | Rodgers .......................... 702/62 | 2007/0263647 A1 | 11/2007 | Shorty et al. .................. 370/406 |
| 2005/0122944 A1 | 6/2005 | Kwon et al. ................... 370/338 | 2007/0265947 A1 | 11/2007 | Schimpf et al. ................. 705/35 |
| 2005/0136972 A1 | 6/2005 | Smith et al. ................. 455/554.1 | 2007/0266429 A1 | 11/2007 | Ginter et al. .................... 726/12 |
| 2005/0172024 A1 | 8/2005 | Cheifot et al. ................. 709/225 | 2007/0271006 A1 | 11/2007 | Golden et al. ................. 700/295 |
| 2005/0187928 A1 | 8/2005 | Byers ................................ 1/1 | 2007/0276547 A1 | 11/2007 | Miller ............................ 700/295 |
| 2005/0193390 A1 | 9/2005 | Suzuki et al. ................. 717/178 | 2008/0011864 A1 | 1/2008 | Tessier et al. ................... 236/51 |
| 2005/0195757 A1 | 9/2005 | Kidder et al. ................. 370/278 | 2008/0018492 A1 | 1/2008 | Ehrke et al. .............. 340/870.03 |
| 2005/0201397 A1 | 9/2005 | Petite ............................ 370/401 | 2008/0024320 A1 | 1/2008 | Ehrke et al. .............. 340/870.02 |
| 2005/0228874 A1 | 10/2005 | Edgett et al. .................. 709/220 | 2008/0031145 A1 | 2/2008 | Ethier et al. ................... 370/248 |
| 2005/0243867 A1 | 11/2005 | Petite ............................ 370/474 | 2008/0032703 A1 | 2/2008 | Krumm et al. .............. 455/456.1 |
| 2005/0249113 A1 | 11/2005 | Kobayashi et al. ............ 370/219 | 2008/0037569 A1 | 2/2008 | Werb et al. .................... 370/406 |
| 2005/0251403 A1 | 11/2005 | Shuey .............................. 705/1 | 2008/0042874 A1 | 2/2008 | Rogai ....................... 340/870.03 |
| 2005/0257215 A1 | 11/2005 | Denby et al. .................. 717/172 | 2008/0046388 A1 | 2/2008 | Budike, Jr. ..................... 705/412 |
| 2005/0270173 A1 | 12/2005 | Boaz ......................... 340/870.02 | 2008/0048883 A1 | 2/2008 | Boaz ....................... 340/870.02 |
| 2005/0276243 A1 | 12/2005 | Sugaya et al. ................. 370/328 | 2008/0051036 A1 | 2/2008 | Vaswani et al. ................. 455/69 |
| 2005/0286440 A1 | 12/2005 | Strutt et al. .................... 370/253 | 2008/0063205 A1 | 3/2008 | Braskich et al. ............... 380/270 |
| 2006/0028355 A1 | 2/2006 | Patterson et al. .......... 340/870.02 | 2008/0068217 A1 | 3/2008 | Van Wyk et al. ......... 340/870.11 |
| 2006/0055432 A1 | 3/2006 | Shimokawa et al. ............ 327/5 | 2008/0068994 A1 | 3/2008 | Garrison et al. ............... 370/230 |
| 2006/0056363 A1 | 3/2006 | Ratiu et al. .................... 370/338 | 2008/0068996 A1 | 3/2008 | Clave et al. ................. 370/230.1 |
| 2006/0056368 A1 | 3/2006 | Ratiu et al. .................... 370/338 | 2008/0086560 A1 | 4/2008 | Monier et al. ................. 709/224 |

| | | | | | | | | |
|---|---|---|---|---|---|---|---|---|
| 2008/0089314 | A1 | 4/2008 | Meyer et al. ............... 370/349 | | 2009/0303972 | A1 | 12/2009 | Flammer, III et al. ........ 370/338 |
| 2008/0095221 | A1 | 4/2008 | Picard ......................... 375/224 | | 2009/0310593 | A1 | 12/2009 | Sheynblat et al. ............. 370/350 |
| 2008/0097782 | A1 | 4/2008 | Budike, Jr. .................... 705/1.1 | | 2009/0315699 | A1 | 12/2009 | Satish et al. ................... 340/533 |
| 2008/0107034 | A1 | 5/2008 | Jetcheva et al. ............... 370/238 | | 2009/0319672 | A1 | 12/2009 | Reisman ....................... 709/227 |
| 2008/0117110 | A1 | 5/2008 | Luglio et al. ................... 343/702 | | 2009/0320073 | A1 | 12/2009 | Reisman .......................... 725/51 |
| 2008/0129538 | A1 | 6/2008 | Vaswani et al. .......... 340/870.03 | | 2010/0037069 | A1 | 2/2010 | Deierling et al. ............. 713/193 |
| 2008/0130535 | A1 | 6/2008 | Shorty et al. ................... 370/310 | | 2010/0037293 | A1 | 2/2010 | Stjohns et al. ..................... 726/2 |
| 2008/0130562 | A1 | 6/2008 | Shorty et al. ................... 370/329 | | 2010/0040042 | A1 | 2/2010 | Van Greunen et al. ........ 370/350 |
| 2008/0132185 | A1 | 6/2008 | Elliott et al. ................. 455/115.4 | | 2010/0060259 | A1 | 3/2010 | Vaswani et al. .................. 324/86 |
| 2008/0136667 | A1 | 6/2008 | Vaswani et al. .......... 340/870.02 | | 2010/0061272 | A1 | 3/2010 | Veillette ........................ 370/254 |
| 2008/0151795 | A1 | 6/2008 | Shorty et al. ................... 370/310 | | 2010/0061350 | A1 | 3/2010 | Flammer, III ................. 370/338 |
| 2008/0151824 | A1 | 6/2008 | Shorty et al. ................... 370/329 | | 2010/0073193 | A1 | 3/2010 | Flammer, III ............ 340/870.11 |
| 2008/0151825 | A1 | 6/2008 | Shorty et al. ................... 370/329 | | 2010/0074176 | A1 | 3/2010 | Flammer, III et al. ........ 370/328 |
| 2008/0151826 | A1 | 6/2008 | Shorty et al. ................... 370/329 | | 2010/0074304 | A1 | 3/2010 | Flammer, III .................. 375/134 |
| 2008/0151827 | A1 | 6/2008 | Shorty et al. ................... 370/329 | | 2010/0138660 | A1 | 6/2010 | Haynes et al. ................. 713/171 |
| 2008/0154396 | A1 | 6/2008 | Shorty et al. ....................... 700/90 | | 2010/0238917 | A1 | 9/2010 | Silverman et al. ............ 370/350 |
| 2008/0159213 | A1 | 7/2008 | Shorty et al. ................... 370/329 | | 2011/0066297 | A1 | 3/2011 | Saberi et al. ................... 700/287 |
| 2008/0165712 | A1 | 7/2008 | Shorty et al. ................... 370/310 | | | | | |
| 2008/0170511 | A1 | 7/2008 | Shorty et al. ................... 370/254 | | | | | |

FOREIGN PATENT DOCUMENTS

| | | | |
|---|---|---|---|
| EP | 0 663 746 | B1 | 1/2003 |
| EP | 0 812 502 | B1 | 8/2004 |
| EP | 0 740 873 | B1 | 12/2005 |
| JP | 10-070774 | | 3/1998 |
| JP | 10-135965 | | 5/1998 |
| WO | WO 95/12942 | | 5/1995 |
| WO | WO 96/10307 | | 4/1996 |
| WO | WO 96/10307 | A1 | 4/1996 |
| WO | WO 00/54237 | | 9/2000 |
| WO | WO 01/26334 | | 4/2001 |
| WO | WO 01/55865 | | 8/2001 |
| WO | WO 03/015452 | | 2/2003 |
| WO | WO 2005/091303 | | 9/2005 |
| WO | WO 2006/059195 | | 6/2006 |
| WO | WO 2007/015822 | | 8/2007 |
| WO | WO 2007/132473 | | 11/2007 |
| WO | WO 2008/027457 | | 3/2008 |
| WO | WO 2008/033287 | A2 | 3/2008 |
| WO | WO 2008/033514 | A2 | 3/2008 |
| WO | WO 2008/038072 | | 4/2008 |
| WO | WO 2008/092268 | A1 | 8/2008 |
| WO | WO 2009/067251 | | 5/2009 |

| | | | | |
|---|---|---|---|---|
| 2008/0177678 | A1 | 7/2008 | Di Martini et al. ........... 705/512 |
| 2008/0180274 | A1 | 7/2008 | Cumeralto et al. ....... 340/870.02 |
| 2008/0181133 | A1 | 7/2008 | Thubert et al. ................ 370/255 |
| 2008/0183339 | A1 | 7/2008 | Vaswani et al. ............... 700/297 |
| 2008/0186202 | A1 | 8/2008 | Vaswani et al. .......... 340/870.03 |
| 2008/0186203 | A1 | 8/2008 | Vaswani et al. .......... 340/870.11 |
| 2008/0187001 | A1 | 8/2008 | Vaswani et al. ............... 370/466 |
| 2008/0187116 | A1 | 8/2008 | Reeves et al. ............. 379/106.09 |
| 2008/0189415 | A1 | 8/2008 | Vaswani et al. ............... 709/226 |
| 2008/0189436 | A1 | 8/2008 | Vaswani et al. ............... 709/242 |
| 2008/0204272 | A1 | 8/2008 | Ehrke et al. ............... 340/870.02 |
| 2008/0205355 | A1 | 8/2008 | Liu et al. ........................ 370/338 |
| 2008/0224891 | A1 | 9/2008 | Ehrke et al. ............... 340/870.02 |
| 2008/0225737 | A1 | 9/2008 | Gong et al. .................... 370/252 |
| 2008/0238714 | A1 | 10/2008 | Ehrke et al. ............... 340/870.02 |
| 2008/0238716 | A1 | 10/2008 | Ehrke et al. ............... 340/870.03 |
| 2008/0272934 | A1 | 11/2008 | Wang et al. ............... 340/870.11 |
| 2008/0283620 | A1 | 11/2008 | Knapp ......................... 236/12.16 |
| 2008/0310311 | A1 | 12/2008 | Flammer et al. .............. 370/238 |
| 2008/0310377 | A1 | 12/2008 | Flammer et al. .............. 370/338 |
| 2008/0317047 | A1 | 12/2008 | Zeng et al. ..................... 370/401 |
| 2008/0318547 | A1 | 12/2008 | Ballou, Jr. et al. ............ 455/410 |
| 2009/0003214 | A1 | 1/2009 | Vaswani et al. ............... 370/236 |
| 2009/0003232 | A1 | 1/2009 | Vaswani et al. ............... 370/252 |
| 2009/0003243 | A1 | 1/2009 | Vaswani et al. ............... 370/255 |
| 2009/0003356 | A1 | 1/2009 | Vaswani et al. ............... 370/400 |
| 2009/0010178 | A1 | 1/2009 | Tekippe .......................... 370/254 |
| 2009/0034418 | A1 | 2/2009 | Flammer, III et al. ........ 370/238 |
| 2009/0034419 | A1 | 2/2009 | Flammer, III et al. ........ 370/238 |
| 2009/0034432 | A1 | 2/2009 | Bonta et al. .................... 370/255 |
| 2009/0043911 | A1 | 2/2009 | Flammer et al. .............. 709/238 |
| 2009/0046732 | A1 | 2/2009 | Pratt, Jr. et al. ............... 370/406 |
| 2009/0055032 | A1 | 2/2009 | Rodgers ......................... 700/295 |
| 2009/0068947 | A1 | 3/2009 | Petite ............................. 455/462 |
| 2009/0077405 | A1 | 3/2009 | Johansen ........................ 713/323 |
| 2009/0079584 | A1 | 3/2009 | Grady et al. ............. 340/870.02 |
| 2009/0082888 | A1 | 3/2009 | Johansen .......................... 700/94 |
| 2009/0096605 | A1 | 4/2009 | Petite et al. ............... 340/539.22 |
| 2009/0102737 | A1 | 4/2009 | Birnbaum et al. ............. 343/828 |
| 2009/0115626 | A1 | 5/2009 | Vaswani et al. .......... 340/870.02 |
| 2009/0129575 | A1 | 5/2009 | Chakroaborty et al. . 379/201.03 |
| 2009/0132220 | A1 | 5/2009 | Chakroborty et al. .......... 703/13 |
| 2009/0134969 | A1 | 5/2009 | Veillette .......................... 340/3.1 |
| 2009/0135677 | A1 | 5/2009 | Veillette ........................... 368/47 |
| 2009/0135716 | A1 | 5/2009 | Veillette ......................... 370/221 |
| 2009/0135843 | A1 | 5/2009 | Veillette ......................... 370/406 |
| 2009/0136042 | A1 | 5/2009 | Veillette ......................... 380/279 |
| 2009/0138777 | A1 | 5/2009 | Veillette ......................... 714/748 |
| 2009/0161594 | A1 | 6/2009 | Zhu et al. ....................... 370/312 |
| 2009/0167547 | A1 | 7/2009 | Gilbert ........................... 340/662 |
| 2009/0168846 | A1 | 7/2009 | Filippo, III et al. ............ 375/133 |
| 2009/0175238 | A1 | 7/2009 | Jetcheva et al. ............... 370/329 |
| 2009/0179771 | A1 | 7/2009 | Seal et al. ................. 340/870.04 |
| 2009/0201936 | A1 | 8/2009 | Dumet et al. .................. 370/401 |
| 2009/0235246 | A1 | 9/2009 | Seal et al. ...................... 717/173 |
| 2009/0243840 | A1 | 10/2009 | Petite et al. ................ 340/539.1 |
| 2009/0245270 | A1 | 10/2009 | van Greunen et al. ........ 370/410 |
| 2009/0262642 | A1 | 10/2009 | van Greunen et al. ........ 370/216 |
| 2009/0267792 | A1 | 10/2009 | Crichlow ................. 340/870.02 |
| 2009/0285124 | A1 | 11/2009 | Aguirre et al. ................. 370/255 |

OTHER PUBLICATIONS

Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt.

Katz, Randy H. and Brewer, Eric A., "The Case for Wireless Overlay Networks," *Electrical Engineering and Computer Science Department*, University of California, Berkeley, 12 pp., 1996.

Johnson, David B., "Routing in Ad Hoc Networks of Mobile Hosts," *IEEE*, pp. 158-163, 1995.

International Search Report and Written Opinion for Application No. PCT/US08/13027, dated Feb. 9, 2009, 6 pp.

International Search Report and Written Opinion for Application No. PCT/US08/13023, dated Jan. 12, 2009, 10 pp.

International Search Report and Written Opinion for Application No. PCT/US08/13019, dated Jan. 12, 2009, 13 pp.

International Search Report and Written Opinion for Application No. PCT/US08/13025, dated Jan. 13, 2009, 7 pp.

International Search Report and Written Opinion for Application No. PCT/US08/13018, dated Jan. 30, 2009, 9 pp.

International Search Report and Written Opinion for Application No. PCT/US08/13020, dated Jan. 9, 2009, 8 pp.

International Search Report and Written Opinion for Application No. PCT/US08/13028, dated Jan. 15, 2009, 9 pp.

International Search Report and Written Opinion for Application No. PCT/US08/13021, dated Jan. 15, 2009, 11 pp.

International Search Report and Written Opinion for Application No. PCT/US08/13016, dated Jan. 9, 2009, 7 pp.

International Search Report and Written Opinion for Application No. PCT/US08/13024, dated Jan. 13, 2009, 9 pp.

International Search Report and Written Opinion for Application No. PCT/US08/13022, dated Jan. 27, 2009, 10 pp.

International Search Report and Written Opinion for Application No. PCT/US08/13030, dated Jan. 9, 2009, 7 pp.
International Search Report and Written Opinion for Application No. PCT/US08/12161, dated Mar. 2, 2009, 13 pp.
International Search Report and Written Opinion for Application No. PCT/US08/13017, dated Mar. 18, 2009, 11 pp.
International Search Report and Written Opinion for Application No. PCT/US08/13032, dated May 12, 2009, 14 pp.
International Search Report and Written Opinion for Application No. PCT/US08/13026, dated Feb. 24, 2009, 9 pp.
International Search Report and Written Opinion for Application No. PCT/US08/13029, dated Feb. 2, 2009, 8 pp.
Leis, John, "TCP/IP Protocol Family," pp. 1 and 42-43, Apr. 3, 2006.
Supplementary European Search Report for Application No. EP 08 85 1869, dated Dec. 30, 2010, 7 pp.
International Search Report for Application No. PCT/US10/26956, dated May 19, 2010, 2 pp.
Supplementary European Search Report for Application No. EP 08 85 1132, dated Dec. 6, 2010, 9 pp.
Baumann, R., et al., "Routing Packets Into Wireless Mesh Networks," *Wireless and Mobile Computing, Networking and Communications*, 2007, WIMOB 2007, Third IEEE International Conference, Piscataway, NJ, Oct. 8, 2007, p. 38 (XP031338321).
Levis Stanford University, J. P. Vasseur, Cisco Systems, et al., "Overview of Existing Routing Protocols for Low Power and Lossy Networks," draft-levis-rl2n-overview-protocols-02.txt, IETF Standard-Working-Draft, Internet Engineering Task Force, IETF, Ch, No. 2, Nov. 17, 2007 (XP015054252) (ISSN: 0000-0004).
Culler Arch Rock, J.P. Vasseur, Cisco Systems, et al., "Routing Requirements for Low Power and Lossy Networks, draft-culler-rl2n-routing-reqs-01.txt," IETF Standard-Working-Draft, Internet Engineering Task Force, IETF, CH, No. 1, Jul. 7, 2007 (XP015050851) (ISSN: 000-0004).
Perkins, C. E., et al., "Ad Hoc On-Demand Distance Vector (AODV) Routing," Network Working Group Internet Draft, XX, Nov. 9, 2001 (XP002950167).
Postel, J., "RFC 793 Transmission Control Protocol," Sep. 1981 [retrieved on Jan. 1, 2007], Retrieved From the Internet: http://www.ietf.org/rfc/rfc0793.txt.
Supplementary European Search Report for Application No. EP 08 85 1927, dated Dec. 22, 2010, 10 pp.
Younis, M., et al., "Energy-Aware Routing in Cluster-Based Sensor Networks," Modeling, Analysis and Simulation of Computer and Telecommunications Systems, 10$^{th}$ IEEE Proceedings on Mascots, Oct. 11-16, 2002, Piscataway, NJ (XP010624424) (ISNB: 978-0-7695-1840-4).
Supplementary European Search Report for Application No. EP 08 85 3052, dated Mar. 18, 2011, 10 pp.
Supplementary European Search Report for Application No. EP 08 85 1560, dated Mar. 24, 2011, 9 pp.
Supplementary European Search Report for Application No. EP 08 85 2992, dated Mar. 23, 2011, 6 pp.
Reexamination U.S. Appl. No. 90/008,011, filed Jul. 24, 2006, 75 pp.
Hydro One Networks, Inc., Request for Proposal for Smart Metering Services, 16 pp., Mar. 4, 2005.
Trilliant Networks, "The Trilliant AMI Solution," RFP SCP-07003, 50 pp., Mar. 22, 2007.
"ZigBee Smart Energy Profile Specification," ZigBee Profile 0x0109, Revision 14, Document 075356r14, 202 pp., May 29, 2008.
Hubaux, J. P., et al. "Towards Mobile Ad-Hoc WANs: Terminodes," 2000 IEEE, Wireless Communications and Networking Conference, WCNC, vol. 3, pp. 1052-1059, 2000.
Miklos, G., et al., "Performance Aspects of Bluetooth Scatternet Formation," First Annual Workshop on Mobile and Ad Hoc Networking and Computing, MobiHOC 2000, pp. 147-148, 2000.
Eng, K. Y., et al. "BAHAMA: A Broadband Ad-Hoc Wireless ATM Local-Area Network," 1995 IEEE International Conference on Communications, ICC '95 Seattle, 'Gateway to Globalization', vol. 2, pp. 1216-1223, Jun. 18-22, 1995.
Lee, David J. Y., "Ricocheting Bluetooth," 2nd International Conference on Microwave and Millimeter Wave Technology Proceedings, ICMMT 2000, pp. 432-435, 2000.

Lilja, Tore, "Mobile Energy Supervision," Twenty-second International Telecommunications Energy Conference, 2000 INTELEC, pp. 707-712, 2000.
Parkka, Juha, et al., "A Wireless Wellness Monitor for Personal Weight Management," Proceedings of the 2000 IEEE EMBS International Conference on Information Technology Applications in Biomedicine, pp. 83-88, 2000.
Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.
Privat, G., "A System-Architecture Viewpoint on Smart Networked Devices," Microelectronic Engineering, vol. 54, Nos. 1-2, pp. 193-197, Dec. 2000.
Jonsson, U., et al., "MIPMANET—Mobile IP for Mobile Ad Hoc Networks," MobiHOC 2000, First Annual Workshop on Mobile and Ad Hoc Networking and Computing, pp. 75-85 (12 pp. with Abstract), 2000.
Kapoor, R., et al., "Multimedia Support Over Bluetooth Piconets," First Workshop on Wireless Mobile Internet, pp. 50-55, Jul. 2001.
Sung-Yuan, K., "The Embedded Bluetooth CCD Camera," TENCON, Proceedings of the IEEE Region 10 International Conference on Electrical and Electronic Technology, vol. 1, pp. 81-84 (5 pp. with Abstract), Aug. 19-22, 2001.
Lim, A., "Distributed Services for Information Dissemination in Self-Organizing Sensor Networks," Journal of the Franklin Institute, vol. 338, No. 6, pp. 707-727, Sep. 2001.
Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.
Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.
Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.
International Search Report and Written Opinion for Application No. PCT/US09/05008, dated Oct. 22, 2009, 8 pp.
Nachum Shacham, Edwin B. Brownrigg, & Clifford A. Lynch, *A Packet Radio Network for Library Automation*, 1987 IEEE Military Communications Conference, vol. 2 at 21.3.1, (Oct. 1987). (TN-IP 0004176-82).
Nachum Shacham & Janet D. Tornow, Future Directions in Packet Radio Technology, Proc. of the IEEE Infocom 1985 at 93 (Mar. 1985). (TN-IP 0005080-86), 17 pp.
John Jubin & Janet D. Tornow, The DARPA Packet Radio Network Protocols, Proc. of the IEEE, vol. 75, No. 1 at 21 (Jan. 87). (TN-IP 0004930-41).
John Jubin, Current Packet Radio Network Protocols, Proc. of the IEEE Infocom1985 at 86 (Mar. 1985), (TN-IP 0004921-29), 9 pp.
David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), (TN-IP 0006929-46), 18 pp.
David B. Johnson, Mobile Host Internetworking Using IP Loose Source Routing, Carnegie Mellon University CMU-CS-93-128, DARPA Order No. 7330 (Feb. 1993), (TN-IP 0006911-28), 18 pp.
Daniel M. Frank, Transmission of IP Datagrams Over NET/ROM Networks, Proc. of the ARRL 7th Computer Networking Conference 1988 at 65 (Oct. 1988), (TN-IP 0006591-96), 6 pp.
Robert E. Kahn, et al., Advances in Packet Radio Technology, Proc. of the IEEE, vol. 66, No. 11, pp. 1468-1496 (Nov. 1978), (TN-IP 0004942-71).
Clifford A. Lynch & Edwin B. Brownrigg, Packet Radio Networks, Bergamon Press, 259-74 (1987), (TN-IP 0004018-175).
Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), (TN-IP 0005018-28), 11 pp.

William MacGregor, Jil Westcott, & Michael Beeler, Multiple Control Stations in Packet Radio Networks, 1982 IEEE Military Communications Conference, vol. 3 at 10.3-1 (Oct.1982), (TN-IP 0004988-93), 6 pp.

Nachum Shacham & Jil Westcott, Future Directions in Packet Radio Architectures and Protocols, Proc. of the IEEE, vol. 75, No. 1 at 83 (Jan. 1987), (TN-IP 0008712-28), 17 pp.

David B. Johnson and David A. Maltz, Protocols for Adaptive Wireless and Mobile Networking, IEEE Personal Communications, Feb. 1996, p. 34-42.

Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.

David A. Beyer, Accomplishments of the DARPA SURAN Program, IEEE MILCOM 1990, p. 39.6.1-8.

William S. Hortos, Application of Neural Networks to the Dynamic Spatial Distribution of Nodes within an Urban Wireless Network, SPIE, vol. 2492, p. 58-70, 1995.

Nachum Shacham and Richard G. Ogier, Network Control and Data Transport for C3I Applications, IEEE 1987, p. 30.5.1-6.

John E. Rustad, Reidar Skaug, and Andreas Aasen, New Radio Networks for Tactical Communication, IEEE Jornal on Selected Areas in Communications, vol. 8, No. 5, p. 713-27, Jun. 1990.

Barry M. Leiner, Donald L. Nielson, and Fouad A. Tobagi, Issues in Packet Radio Network Design, Proceedings of the IEEE, vol. 75, No. 1, p. 6-20, Jan. 1987.

Janet Tornow, Functional Summary of the DARPA SURAP1 Network, DARPA, Sep. 1986, 17 pp.

John F. Shoch and Lawrence Stewart, Interconnecting Local Networks via the Packet Radio Network, Sixth Data Communications Symposium, Nov. 1979, pp. 153-158.

J.R. Cleveland, Performance and Design Considerations for Mobile Mesh Networks, IEEE MILCOM 96, vol. 1, p. 245-49.

Cmdr. R. E. Bruninga, USN, A Worldwide Packet Radio Network, Signal, vol. 42, No. 10, p. 221-230, Jun. 1988.

Nachum Shacham and Janet Tornow, Packet Radio Networking, Telecommunications, vol. 20, No. 9, p. 42-48, 64, 82, Sep. 1986.

Spencer T. Carlisle, Edison's NetComm Project, IEEE 1989, Paper No. 89CH2709-4-B5, p. B5-1-B5-4.

Brian H. Davies and T.R. Davies, The Application of Packet Switching Techniques to Combat Net Radio, Proceedings of the IEEE, vol. 75, No. 1, p. 43-55, Jan. 1987.

Fouad A. Tobagi, Richard Binder, and Barry Leiner, Packet Radio and Satellite Networks, IEEE Communications Magazine, vol. 22, No. 11, p. 24-40, Nov. 1984.

M. Scott Corson, Joseph Macker, and Stephen G. Batsell, Architectural Considerations for Mobile Mesh Networking, IEEE MILCOM 96, vol. 1, p. 225-9.

K.Y. Eng, et. al., Bahama: A Broadband Ad-Hoc Wireless ATM Local-Area Network, 1995 IEEE International Conference on Communications, vol. 2, p. 1216-23, Jun. 18-22, 1995.

J. Jonquin Garcia-Luna-Aceves, A Fail-Safe Routing Algorithm for Multihop Packet-Radio Networks, IEEE INFOCOM '86, p. 434-443, Apr. 8-10, 1986.

Johanes P. Tamtomo, A Prototype of TCP/IP-Based Internet-PRNET for Land Information Networks and Services, Department of Surveying Engineering, University of New Brunswick, Jan. 25, 1993, 118 pp.

A. Alwan, et al., Adaptive Mobile Multimedia Networks, IEEE Personal Communications, p. 34-51, Apr. 1996.

Michael Ball, et al., *Reliability of Packet Switching Broadcast Radio Networks*, IEEE Transactions on Circuits and Systems, vol. Cas-23, No. 12, p. 806-13 ,Dec. 1976.

Kenneth Brayer, Implementation and Performance of Survivable Computer Communication with Autonomous Decentralized Control, IEEE Communications Magazine, p. 34-41, Jul. 1983.

Weidong Chen and Eric Lin, *Route Optimization and Locations Updates for Mobile Hosts*, Proceedings of the 16$^{th}$ ICDCS, p. 319-326, 1996.

Daniel Cohen, Jonathan B. Postel, and Raphael Rom, *Addressing and Routing in a Local Wireless Network*, IEEE INFOCOM 1992, p. 5A.3.1-7.

Charles Perkins and David B. Johnson, *Mobility Support in IPv6*, Sep. 22, 1994, http//www.monarch.cs.rice.edu/internet-drafts/draft-perkins-ipv6-mobility-sup-00.txt (last visited Sep. 26, 2009.

Jonathan J. Hahn and David M. Stolle, *Packet Radio Network Routing Algorithms: A Survey*, IEEE Communications Magazine, vol. 22, No. 11, p. 41-7, Nov. 1984.

David A. Hall, *Tactical Internet System Architecture for the Task Force XXI*, IEEE 1996, p. 219-30

Robert Hinden and Alan Sheltzer, *The DARPA Internet Gateway*, DARPA RFC 823, Sep. 1982, 45 pp.

Manuel Jimenez-Cedeno and Ramon Vasquez-Espinosa, *Centralized Packet Radio Network: A Communication Approach Suited for Data Collection in a Real-Time Flash Flood Prediction System*, Dept. of Electrical and Computer Engineering, University of Puerto Rico-Mayaguez, ACM 0-89791-568-2/93, p. 709-13, 1993.

David B. Johnson, *Routing in Ad Hoc Networks of Mobile Hosts*, Workshop on Mobile Computing Systems and Applications, Dec. 8-9, 1994, Santa Cruz, California, IEEE 1995, p. 158-63.

David B. Johnson, *Route Optimization in Mobile IP*, Nov. 28, 1994, http://www.monarch.cs.rice.edu/internet-drafts/draft-ietf-mobileip-optim-00.txt, (last visited Sep. 26, 2009), 32 pp.

Mark G. Lewis and J.J. Garcia-Luna-Aceves, *Packet-Switching Applique for Tactical VHF Radios*, 1987 IEEE Milcom Communciations Conference, Oct. 19-22, 1987, Washington, D.C., p. 21.2.1-7.

Sioe Mak and Denny Radford, *Design Considerations for Implementation of Large Scale Automatic Meter Reading Systems*, IEEE Transactions on Power Delivery, vol. 10, No. 1, p. 97-103, Jan. 1995.

Charles E. Perkins and Pravin Bhagwat, *A Mobile Networking System Based on Internet Protocol*, IEEE Personal Communications, First Quarter 1994, IEEE 1994, p. 32-41.

Richard Schulman, Richard Snyder, and Larry J. Williams, *SINCGARS Internet Controller—Heart of the Digitized Battlefield*, Proceedings of the 1996 Tactical Communications Conference, Apr. 30-May 2, 1996, Fort Wayne, Indiana, p. 417-21.

Nachum Shacham and Earl J. Craighill, *Dynamic Routing for Real-Time Data Transport in Packet Radio Networks*, Proceedings of INFOCOM 1982, IEEE 1982, p. 152-58.

R. Lee Hamilton, Jr. and Hsien-Chuen Yu, *Optimal Routing in Multihop Packet Radio Networks*, IEEE 1990, p. 389-96.

Carl A. Sunshine, *Addressing Problems in Multi-Network Systems*, Proceedings of INFOCOM 1982, IEEE 1982, p. 12-18.

J.J. Garcia-Luna-Aceves, *Routing Management in Very Large-Scale Networks*, North-Holland, Future Generations Computer Systems 4, 1988, pp. 81-93.

J.J. Garcia-Luna-Aceves, *A Minimum-hop Routing Algorithm Based on Distributed Information*, North-Holland, Computer Networks and ISDN Systems 16, 1988/1989, p. 367-382.

D. Hubner, J. Kassubek, F. Reichert, *A Distributed Multihop Protocol for Mobile Stations to Contact A Stationary Infrastructure*, Third IEE Conference on Telecommunications, Conference Publication No. 331, p. 204-7.

Jens Zander and Robert Forchheimer, *The SOFTNET Project: A Retrospect*, IEEE EUROCON, Jun. 13-17, 1988, p. 343-5.

Mario Gerla and Jack Tzu-Chich Tsai, *Multicluster, Mobile, Multimedia Radio Network*, Wireless Networks 1, J.C. Baltzer AG, Science Publishers, 1995, p. 255-265.

F. G. Harrison, *Microwave Radio in the British TeleCom Access Network*, Second IEE National Conference on Telecommunications, Conference Publication No. 300, Apr. 2-5, 1989, p. 208-13.

Chai-Keong Toh, *A Novel Distributed Routing Protocol to Support Ad-Hoc Mobile Computing*, Conference Proceedings of the 1996 IEEE Fifteenth Annual International Phoenix Conference on Computers and Communications, Mar. 27-29, 1996, p. 480-6.

Fadi F. Wahhab, *Multi-Path Routing Protocol for Rapidly Deployable Radio Networks*, Thesis submitted to the Department of Electrical Engineering and Computer Science of the University of Kansas, 1994, 59 pp.

Jil Westcott and Gregory Lauer, *Hierarchical Routing for Very Large Networks*, IEEE MILCOM 1984, Oct. 21-24, 1984, Conference Record vol. 2, p. 214-8.

"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleId=X234101&CompanyId=3.

Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.

"AMRON Meter Management System" [online], [retrieved on May 12, 2005], 41 pp., Retrieved from the Internet: http://www.amronm5.com/products/.

"UCAIug Home Area Network System Requirements Specification, A Work Product of the OpenHAN Task Force Formed by the SG Systems Working Group Under the Open Smart Grid (OpenSG) Technical Committee of the UCA® International Users Group, Version 2.0," 157 pp., Aug. 30, 2010.

"ZigBee Smart Energy Profile Specification," ZigBee Profile: 0x0109, Revision 15, Dec. 1, 2008, Document 075345r15 (SEP Document), 244 pp.

Edison Electric Institute (EEI), "Uniform Business Practices for Unbundled Electricity Metering, vol. Two," Dec. 5, 2000, 196 pp., www.naesb.org/pdf/ubp120500.pdf.

"ZigBee Smart Energy Profile Specification," ZigBee Profile: 0x0109, Revision 16, Version 1.1, Document 075356r16ZB, 332 pp., Mar. 23, 2011.

"ZigBee Over-the-Air Upgrading Cluster," ZigBee Alliance, Document 095264r18, Revision 18, Version 1.0, 63 pp., Mar. 14, 2010.

IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (WPANs)," IEEE Computer Society, 323 pp., Sep. 8, 2006.

IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (LR-WPANs)," IEEE Computer Society, 679 pp., Oct. 1, 2003.

"ZigBee Cluster Library Specification," ZigBee Alliance, Document 075123r02ZB, 420 pp., May 29, 2008.

Liu, Ryan, et al., "A Survey of PEV Impacts on Electric Utilities," *EEE PES Innovative Smart Grid Technologies Conference*, Anaheim, California, 8 pp., Jan. 17-19, 2011.

"Utility/Lab Workshop on PV Technology and Systems," DTE Energy DER Technology Adoption, DEW Analysis of Renewable, PEV & Storage, Tempe, Arizona, 36 pp., Nov. 8-9, 2010.

"Network Device: Gateway Specification," ZigBee Alliance, ZigBee Document 075468r35, Revision 35, Version No. 1.0, 301 pp., Mar. 23, 2011.

International Search Report and Written Opinion for Application No. PCT/US2011/060694, dated Apr. 9, 2012, 10 pp.

International Search Report and Written Opinion for Application No. PCT/US2011/049227, dated Jan. 31, 2012, 9 pp.

International Search Report and Written Opinion for Application No. PCT/US12/22334, dated Apr. 9, 2012, 9 pp.

International Search Report and Written Opinion for Application No. PCT/US11/56620, dated Mar. 13, 2012, 8 pp.

Supplementary European Search Report for Application No. EP 08 84 2449, dated Nov. 29, 2011, 5 pp.

Lin, Shen, et al., "A Wireless Network Based on the Combination of Zigbee and GPRS" [online], [retrieved on Feb. 16, 2012], IEEE International Conference on Networking, Sensing and Control, Apr. 6-8, 2008, 4 pp., Retrieved From the Internet: http://ieeexplore.ieee.org/xpls/abs_all.jsp?arnumber=4525223.

Telegesis, "ZigBee Gateway Makes Your Meter Smart" [online], 2005 [retrieved on Feb. 16, 2012], 1 p., Retrieved From the Internet: http://www.telegesis.com/downloads/general/SSV%20IP%20gateway%20case%20study.pdf.

Supplementary European Search Report for Application No. EP 09 81 1849, dated Dec. 13, 2011, 9 pp.

Gerla, Mario, et al., Multicasting Protocols for High-Speed, Wormhole-Routing Local Area Networks, ACM SIGCOMM Computer Communication Review, vol. 26, No. 4, Oct. 4, 1996, pp. 184-193.

International Search Report and Written Opinion for Application No. PCT/US2011/049277, dated Jan. 31, 2012, 9 pp.

International Search Report and Written Opinion for Application No. PCT/US11/21167, dated Mar. 21, 2012, 8 pp.

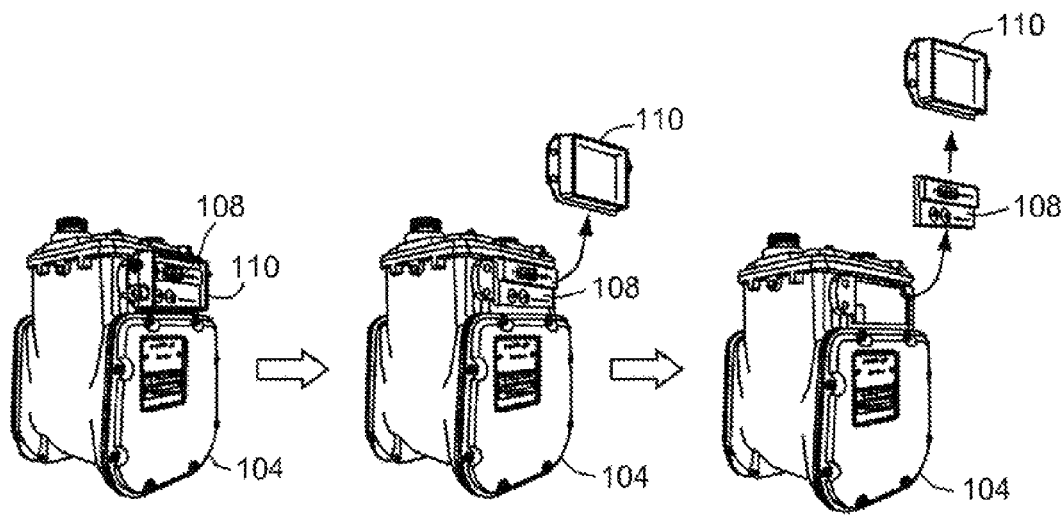
(Prior Art)
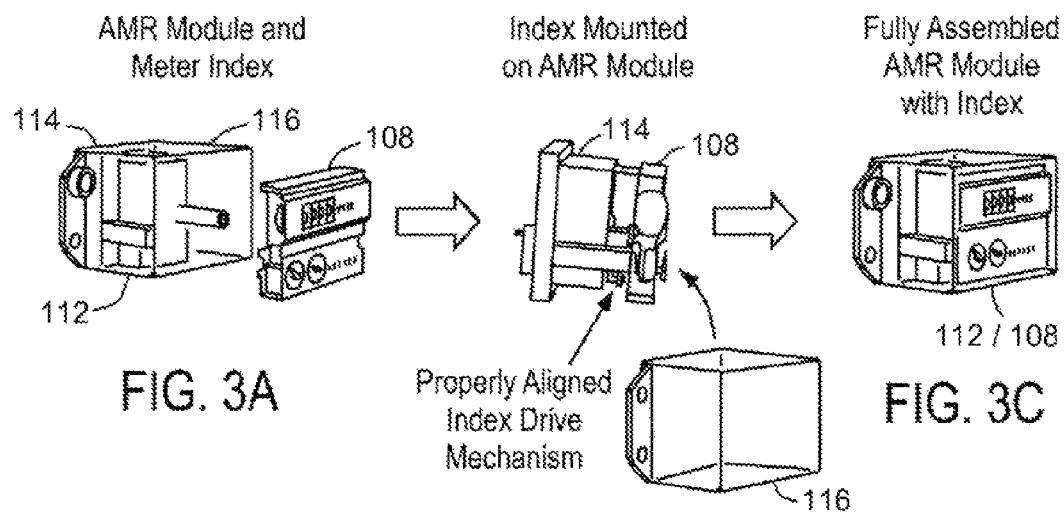
(Prior Art)

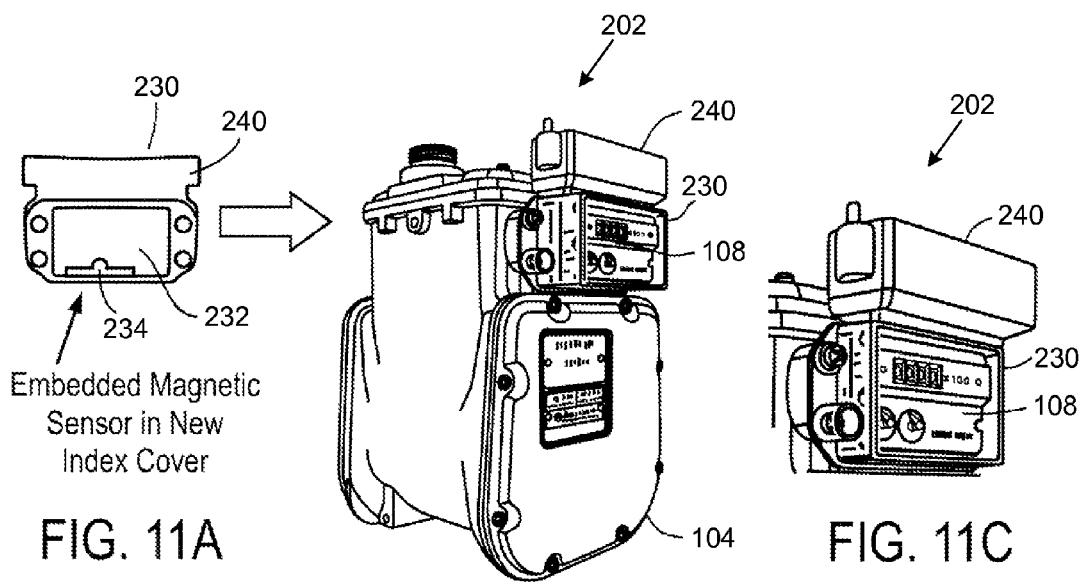
Embedded Magnetic Sensor in New Index Cover
FIG. 11A
FIG. 11B
FIG. 11C
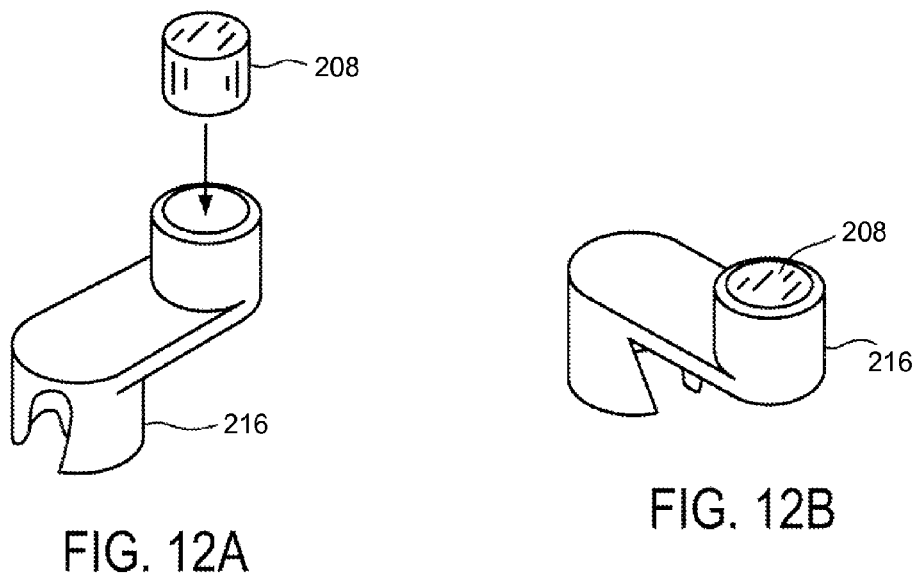
FIG. 12A
FIG. 12B

GAS METER HAVING ULTRA-SENSITIVE MAGNETIC MATERIAL RETROFITTED ONTO METER DIAL AND METHOD FOR PERFORMING METER RETROFIT

CROSS-REFERENCE TO RELATED APPLICATIONS

This application is related to and claims the benefit of priority under one or more of 35 U.S.C 119 and/or 35 U.S.C 120 to U.S. Provisional Application 61/000,548 entitled "Gas Meter Having Ultra-Sensitive Magnetic Material Retrofitted Onto Meter Dial And Method For Performing Meter Retrofit" filed Oct. 25, 2007 and incorporated by reference herein.

FIELD OF THE INVENTION

This invention pertains generally to utility meters and methods for operating and reading such utility meters remotely using automatic meter reading (AMR) techniques in an advanced meter infrastructure (AMI), and more particularly to a structure and method for retrofitting an essentially mechanical utility meter such as a water or gas utility meter so that it may be read remotely using radio-frequency technology and so that the retrofit may be accomplished simply by relative unskilled worker and without potential damage or alteration of the meter or to a current reading stored in the mechanical meter assembly.

BACKGROUND

Heretofore, for the residential class of diaphragm gas meters, the industry standard method for retrofitting one of these meters with an Automatic Meter Reading (AMR) device has been to install the conventional AMR module 112 between the main body of the gas meter and the gas meter's index (register) as shown in FIG. 2-FIG. 4. The index (register) is a mechanical clock work type assembly that is fairly delicate so as to allow it to be driven by and count revolutions of a gas meter shaft that is internally driven by the flow of natural gas or propane through the meter. Similar technology and the associated problems and limitations apply to water utility meters. Electric utility meters, which include or have an available electrical energy supply may also suffer from some of the same problems and limitations as those described for gas meters.

This basic conventional process for retrofitting a conventional AMR device may typically involves the following primary steps. Certain minor steps that may readily be appreciated in conventional retrofit operations are not described to prevent obscuration of the primary steps.

First, the gas meter's index cover is removed from its attachment to the meter over the meter index (register). The index cover is conventionally a simple transparent plastic cover that allows a visual reading of the meter index dials and pointers, and that protects the meter index mechanism.

Second, the delicate mechanical clock work type index assembly is removed from the meter including disengaging the index assembly from its driving gas meter shaft which will continue to rotate if any gas is being consumed. Thus, it is necessary to carefully align the index drive mechanism while the index drive is turning when it is reinstalled, which may tend to cause a misalignment of the keyed shaft with the index assembly.

Third, with the original index still removed from the gas meter, the original index is attached to or mounted onto the conventional AMR module. In known examples of conventional AMR retrofit assemblies and methods, the conventional AMR unit is attached to the back side of the conventional index so that when reassembled, the conventional AMR unit is located between the gas meter body and the original index. This placement at least somewhat diminishes the performance of any radio frequency transmitter or receiver device as the metal of the meter body and the metal of the index tends to shield, attenuate, or block some of the radio frequency signals. Furthermore, the RF antenna that may be provided in the conventional AMR unit may have diminished performance do to the adjacent metallic surfaces and structures.

Fourth, the combined index and conventional AMR assembly is placed onto the meter body, with care being taken to realign the keyed meter shaft (which may be rotating if there is any gas flow). There may also be a possibility that the portion of the index receiving the gas meter shaft was moved or rotated either from handling or to fit it to the AMR unit.

Finally, the index cover or a replacement cover sized to accommodate the volume of the combined AMR unit and index is installed.

It may be noted that when the conventional AMR unit battery requires replacement, at least the index cover needs to be removed thereby again exposing the index and AMR unit to current environmental conditions such as dust, rain, ice, or snow. Depending upon the design of the particular conventional AMR unit, removal of the index cover, index, and AMR unit, may be required to access the battery as well as to perform any service or replacement of the electronics portion of the AMR unit.

Some additional problems and limitations created by this conventional methodology, and by the physical and operational limitations of the AMR module in addition to those already described include: First, the number of steps involved in this conventional retrofit process causes a high labor cost and relatively high skilled technician to perform the tasks without damaging the original or retrofit equipment.

Second, assembly errors can occur during the assembly of the index onto the conventional AMR module and the re-assembly of the conventional AMR device with the index and the combined assembly to the gas meter. If either of these occurs the meter's index no longer accurately tracks the flow of gas through the meter or the customer's gas consumption because of the improper realignment of the index drive mechanism. The removal and replacement may also be susceptible to introducing an error or offset to the actual meter reading. These kinds of errors can go undetected for an extended period of time resulting in lost revenue or over charges by the utility company, additional labor costs to correct the problem at the customer site, as well as possible customer relations problems.

Third, once the conventional AMR module is attached to the gas meter, it is extremely difficult, if not impossible, to change the AMR module's battery in the field, as the above described installation procedure must be reversed and then repeated. These operations will be performed with a unit that has been installed for months or years and with the accumulated dirt on the unit. Either this will all need to be cleaned prior to disassembly and reassembly, or there is significant chance of contaminating the assembly, particularly the clock work type index.

Fourth, the radio frequency (RF) characteristics for the conventional AMR module are poor because it is mounted between the meter, which is made of aluminum, and the meter's index, which is made either of plastic, aluminum or brass and usually includes at least some aluminum or brass components even when plastic in part. Depending upon the radio frequency characteristics of the conventional AMR module radio and the location of a receiver/transmitter for the conventional AMR signal, the aluminum meter and any aluminum, brass, or other metal may severely reduce the ability of the AMR to send or receive radio frequency signals.

Attention is now directed to a conventional gas meter and the procedure in which a conventional AMR device and its retrofit installation has conventionally been achieved.

FIG. 1 is an illustration showing a typical conventional utility gas meter 101 before a conventional AMR retrofit, such as a meter made by the American Meter Company (also known as Elser American Meter, 2221 Industrial Road, Nebraska City, Nebr. 68410 USA). The gas meter includes a gas meter body portion 104 having inlet 105 and outlet 106 plumbing connections, and a meter index 108 covered by a meter index cover 110. The meter index is the portion of the meter 101 that counts and indicates the amount of gas used and is conventionally a rotating clock work type mechanism, wherein the flow of gas through the meter causes a shaft to rotate and the rotation of the shaft which extends to an exterior of the meter body interacts with the meter index. Rotation of gears and dials of the meter index is indicated as a meter index readout. These conventional meter indexes are known in the art and not further described here.

With reference to FIG. 2-FIG. 4, we now describe a conventional industry solution for gas meter retrofit solution as used in the gas metering industry prior to the invention described herein.

With reference to FIG. 2a-FIG. 2c, first the index cover 110 and then the index 108 is removed from the meter body 104.

With reference to FIG. 3a-3b, second, assemble the meter's original index 108 to the AMR module assembly 112 including the AMR module 114 and new AMR module cover 116, being very careful to properly align the meter index drive mechanism between the conventional AMR module 114 and the meter's index 108. If this is not done properly the meter index 108 may be damaged and/or an inaccurate reading will result. Likewise, an inaccurate reading caused by improper alignment or installation may result in contention that the meter reading is inaccurate and an inability to collect for gas consumption.

With reference to FIG. 3c, third, mount the fully assembled AMR module assembly 114 with meter index 108 and the new AMR module cover 116 on the gas meter 101, being very careful to properly align the index drive mechanism (typically a keyed drive shaft) between the meter 108 and the AMR module 114. Again, if this is not done properly the meter index may be damaged and/or an inaccurate reading will result.

With reference to FIG. 4, fourth reattach the index cover 116 which will usually be a replacement cover adapted to cover the increased depth of the original meter index 108 and the added depth of the retrofit AMR module 114. The conventionally retrofitted meter 130 is illustrated in FIG. 4 and shows the conventional AMR module located under the index cover between the meter body 104 and the original index cover 116. It may be appreciated that some of these steps may be combined or divided in different ways.

It will be apparent that the conventional retrofit involves significant disassembly and reassembly steps that require a relatively skilled technician. These retrofit steps are even more problematic since they are conducted in the field, possibly with old and weathered meters, dust or rain in the air, cold temperatures, and other contaminant and environmental challenges. In the event a part is damaged during disassembly or reassembly, the meter may be rendered completely inoperative until replacement parts can be obtained and installed in addition to the AMR module. The size of the AMR module is also significant and increases the size of the index cover and its extension in the local environment potentially making it more vulnerable to damage.

SUMMARY

In one aspect, embodiments of the invention provide a method for retrofitting a mechanical gas meter of the type having a gas meter shaft driven dial assembly with at least one dial index pointer and a transparent glass or plastic index cover, the method comprising: removing the meter existing index cover; attaching a magnet to a meter index dial pointer; and mounting a replacement retrofit index cover which includes an attached AMR electronics module to the meter to complete the installation; the retrofit installation being performed without removing the shaft driven dial assembly.

In a further aspect, embodiments of the invention provide a method for retrofitting a mechanical gas meter of the type having a gas meter shaft driven dial assembly with at least one dial index pointer and a transparent glass or plastic index cover, the method comprising: removing the meter existing index cover; attaching a magnet to a meter index dial pointer; and mounting one or more sensors inside a mounting bezel of the meter between the existing index cover and the meter dial; the retrofit installation being performed without removing the shaft driven dial assembly.

In another aspect, embodiments of the invention provide a retrofit module for a utility meter comprising: an index cover at least a portion of which is transparent so that movement of index dials and pointers to which the index cover is to be attached are visible to visual observer; a sensor disposed within or on a surface of the index cover located to be located proximate to but not intersecting with a volume of space through which an index dial pointer or an extension of such pointer of the meter to which the retrofit modules is to be attached will pass as it rotates; and an electronics module including a housing having a container portion for holding the electronic circuit and the battery and a cover portion for closing the container portion, the electronics module being attached to or integrated with the index cover.

In still another aspect, embodiments of the invention provide a gas meter index cover comprising: a housing including at least one open face for attachment to a gas meter, the housing having at least one transparent portion to permit human visual observation of meter index dials and pointers when it is installed for operation on a gas meter; and a sensor including magnetically sensitive material that is responsive to detect the presence or transient passage of a permanent magnet and to thereby identify a rotation or partial rotation of a meter dial index pointer to which the magnet will be attached.

In still another aspect, embodiments of the invention provide a system and method for performing automated meter reading comprising: an AMI retrofit assembly including a mechanical to electrical conversion device, a radio for communicating a meter reading to an external requestor and optionally for receiving data and commands; a network for communicating the meter reading from the radio to a requesting server; and the server for controlling the operation of the system.

Other features and aspects of the invention and embodiments thereof will be apparent from the following description and drawings.

BRIEF DESCRIPTION OF THE DRAWINGS

The foregoing and other advantages of the invention will be more fully understood with reference to the description of the best embodiment and the drawing wherein:

FIG. 2 is an illustration showing a stage in the conventional industry solution for gas meter retrofit solution as used in the gas metering industry.

FIG. 3 is an illustration showing a further stage in the conventional industry solution for gas meter retrofit solution as used in the gas metering industry.

FIG. 11 is an illustration showing still a stage in the retrofit of an AMR assembly to a conventional mechanical gas meter according to an embodiment of the invention.

FIG. 12 is an illustration showing an exemplary embodiment of a magnet (or metal) carrying slip-on or snap-on cap or fitment for the index dial pointer have been show and described elsewhere herein, FIG. 12A and FIG. 12B illustrate two different perspective views of an exemplary embodiment of such cap.

FIG. 13 is an illustration showing two different perspective views of an embodiment of retrofit index cover, wherein

DETAILED DESCRIPTION

Figure 1:
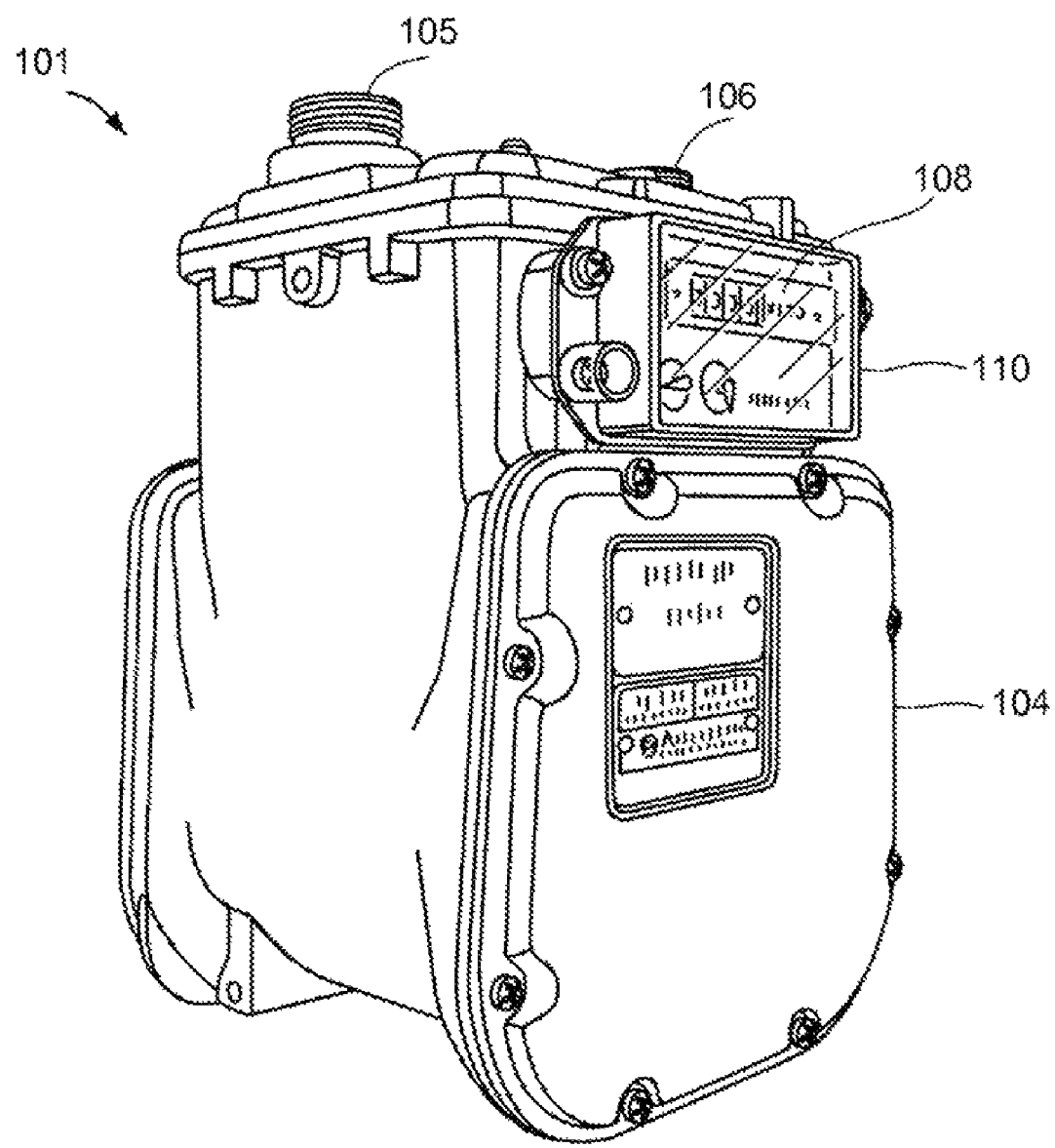
FIG. 1 is an illustration showing a typical conventional utility gas meter before an AMR retrofit.
Figure 4:
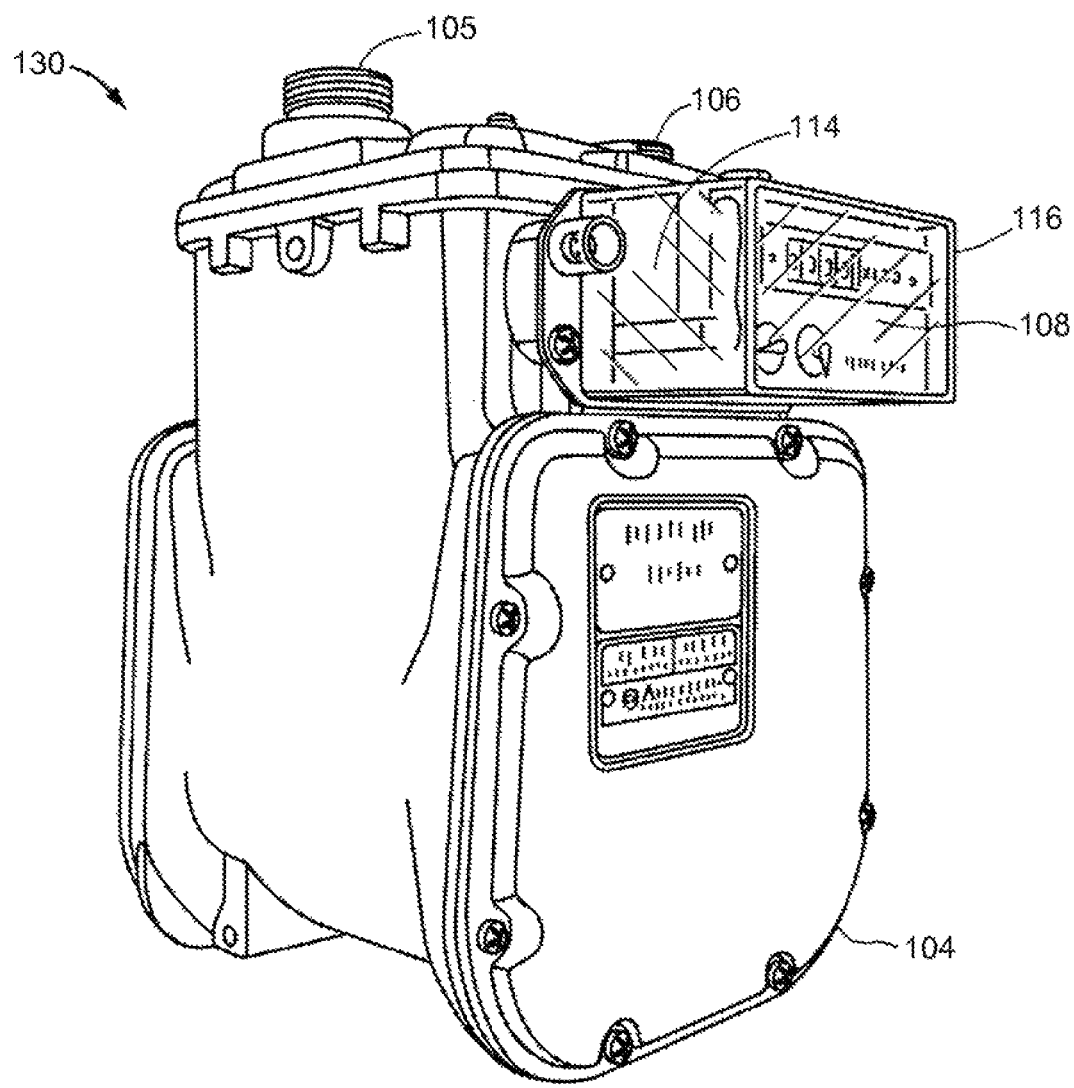
FIG. 4 is an illustration showing still a further stage in the conventional industry solution for gas meter retrofit solution as used in the gas metering industry.

Exemplary embodiments of the invention are now described relative to the drawings.

The inventive solution overcomes these conventional problems and limitations. Firstly, although the inventive retrofit AMR module 202 does require the removal of the glass or plastic cover 110 that typically overlays the gas meter's index 108, embodiments of the invention do not require the removal of the gas meter's index 108. Instead, a small magnet 208 is simply attached by some attachment means 216 to the (or to one of the) proving dial pointers 214-1, 214-2 on the gas meter index 206 as described in greater detail elsewhere herein.

Figure 10:
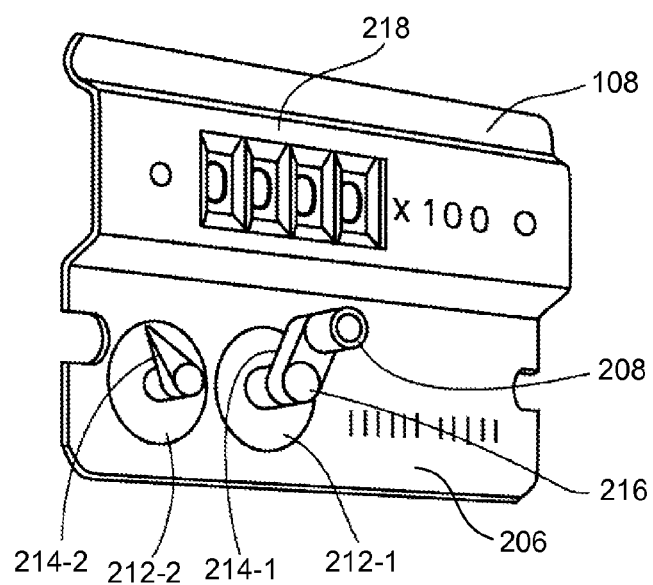
FIG. 10 is an illustration showing a further stage in the retrofit of an AMR assembly to a conventional mechanical gas meter according to an embodiment of the invention.

In one non-limiting embodiment the attachment of the small magnet 208 to the proving dial pointer 214 is via a cap 216 that is attached to or slips over or snaps onto the proving dial pointer 214 and carries a small round button shaped magnet 208. This may be a friction fit, particularly if the cap is made of a somewhat resilient material such as a plastic or polymeric material. In other embodiments, the magnet 208 may be attached in a different manner or by other attachment means 216, such as by using an adhesive or other fastener or fastening means. Then manner or means of attachment is not a limitation of the invention and any convenient means of fastening or means of attachment may be utilized, though the particular attachments described are simple to implement. Embodiments of the invention advantageously provides an inventive AMR retrofit module 202 and the magnet attachment to the proving dial pointer 214 that permits the proving dial 212 and proving dial pointer 214 to remain visible after the retrofit. Note that the proving dial 212 is typically a round dial having a scale of numbers (such as from 0-9) that when compared to the proving dial pointer 214 permit a manual or visual observation of the meter operation and gas consumption. The proving dial pointer is carried by a proving dial pointer shaft 216 that is driven directly or indirectly by the gas meter shaft. In some meters and meter indexes there may also be a mechanical digital display wherein a certain number of rotations of an index dial or pointer causes the digital display to change in the manner of an automobile mechanical odometer. This type of combined meter proving dial with pointer and digital display is illustrated in FIG. 10 wherein a first proving dial 212-1 and first proving dial pointer 214-1 and a second proving dial 212-2 and second proving dial pointer 214-2 are illustrated along with a 4 digit digital counter 218 is illustrated. It may be noted that the magnet 208 and attachment means 216 are shown here attached to proving dial index 212-1.

Advantageously, embodiments of the invention provide a cap 216 that is transparent or translucent so that the at least a portion of the dial pointer remains visible. Other embodiments of the cap 216 (or other attachment means) may be transparent or of an opaque material, but in such instances, the cap 216 does not completely cover the dial or dial pointer so that at least a portion (such as the pointer tip) remains visible in operation. In some countries, regions, and/or utility markets there may be a requirement that the meter index dial 212 and/or meter index dial pointer 214 remain visible or substantially after such retrofit operation, and embodiments of the invention provide such visibility or substantial visibility so that both the index dial and the index dial pointer moving relative to the index dial may readily be observed. Using an opaque material for some of the AMR module 202 portions may be advantageous (though not required) in order to provide a better environment including better temperature control, structural strength, and UV filtering or blocking than a transparent AMR housing portion would provide.

Embodiments of the inventive retrofit index cover 230 including the transparent portion 232 through which the index dials and pointers 212, 214 and any digital counter 218 remain visible, which replaces the meter's old index cover 110, advantageously has portions of inventive AMR module integrated with it. For example, the inventive index cover 230 also contains an embedded magnetic sensor 234 and an electronic module portion 236 that houses certain sensor electronics 240 that receive signals associated with the magnetic sensor 234 and a battery 242 or other energy storage means to power the sensor electronics. The sensor may be attached to the interior of the retrofit index cover so that it is protected from the external environment and located physically close to the magnet carried by the cap 216 on the proving index pointer 214. Wires, flexible printed circuit connectors, or other electrical coupling or connection means 244, coming from the sensor may be routed within the index cover to the electronic module portion 236. In one embodiment the embedded sensor includes a switch 235 which can be either a normally-open or normally-closed switch and which momentarily changes state from a first state to a second state to indicate the passing of the cap 216 carried magnet 208 past the sensor. The sensor is electrically coupled to a sensing an counting circuit within the inventive AMR module electronics module portion 236 to record and store a count or value which is equal to or in proportion to the number of rotations of the proving dial 212 and proving dial pointer 214 to which the cap 216 and magnet 208 is attached.

In some non-limiting embodiments, a plurality of such sensors 234 and proving index dial 214 and cap carrying magnet 216/208 combinations may be used but such multiple sensor configurations are not typically required to achieve a desired meter reading sensitivity or resolution. In at least one non-limiting embodiment, the sensor 234 includes a plurality of switches 235, that may for example be used to sense partial rotations of the index dial pointer 214, provide some immunity to electrical noise or spikes that might be mis-interpreted as a complete rotation, for redundancy purposes, or for other reasons. For example, in one non-limiting embodiment, one switch 235-1 is placed at a point where a complete rotation is to be measured and a second switch 235-2 is placed to generate a count or electrical pulse just prior to the full rotation count. In this case, it would be expected that during a continuous use of gas, the two switches would close (or open) within some short time period and the combination indicating a full rotation. Alternatively or in addition, a second (or third switch) might be placed at an intermediate location such as at ½ of a full rotation to measure gas consumption with greater precision. Furthermore, a plurality of sensors 234 may be used to achieve these same or analogous benefits.

In one non-limiting embodiment, the sensor 234 includes the one switch 235 or the plurality of switches in an assembly that includes electrical wires 244, flexible printed circuit card connectors, or other electrical connection means. In one non-limiting embodiment, the sensor assembly 234 is sized to fit into a depression or cavity molded into an internal surface 231 of the new retrofit transparent cover 230 and then fixed in place by flowing an adhesive or epoxy filling material into the cavity to cover the assembly and fix it in place. In one non-limiting embodiment, the sensor assembly 234 is molded in place during manufacture of the cover 230, but this may not be preferred as it may increase manufacturing costs. In one non-limiting embodiment, the sensor assembly 234 is simply adhered to a substantially flat or planar interior surface of the cover 230 such as by using an adhesive, ultrasonic welding, mechanical attachment or other fastening or adhesive means. In either implementation, it is desirable for the sensor switch 235 to be located very close to the dial pointer and to the dial pointer 214 attached or carried magnet 208 so that the magnet may be small enough to only activate the switch 235 of the sensor 234 when it passes the switch. If the distance is too large then a larger than necessary magnet may be needed to activate the switch 235, and such larger magnet may reduce the precision of the count and decrease accuracy and precision of the meter reading operation. In typical embodiments, the magnet 208 may have a diameter of from about 1/16 of an inch to about ¼ of an inch, more usually about ⅛ of an inch in diameter. The depth or thickness of the magnet may typically vary from about 1/32 of an inch to about ¼ of an inch, and more usually between about 1/32 of an inch and ⅛ of an inch. It will be appreciated that generally the smallest magnet (diameter and thickness) that produces the desired switching is most desirable. Although disc-like shaped magnets are advantageously used, embodiments of the invention are not limited to these and other shapes of magnet 208 may be employed.

In one non-limiting embodiment, the switch or switches 235 within the sensor assembly 234 may be simple reed type micro switches where the movement of the magnet past a reed causes the reed to move toward a mechanical (and electrical) contact with a stationary portion of the switch, and then to move away and break the contact. Alternatively the movement may cause a contact to be broken and then to be reestablished after the magnet passes. Alternatively, other sensors 234 may be employed that do not use a switch but which otherwise detect the passage of the magnet 208. For example, an electronic circuit, such as one including a coil, and that generates a voltage difference or a current when the magnet passes the sensor and which voltage or current may be detected may be used. Alternatively, an optical detector may be used as the sensor wherein a change in light level is detected to generate a sensor signal that is used to indicate a count.

Other non-limiting embodiments may use different switches 235 operating on different mechanical, electrical, or chemical principles. In one alternative embodiment, the cap 216 attached to the dial pointer 214 carries a metal portion and different sensor switch or switches have a magnet or magnetic property that permits sensing of the passing of the metal over the sensor switches. Other embodiments, may utilize optical properties (such as photodiodes that can detect a change in light striking the sensor) or other properties. In any case, advantageously the inventive retrofit device includes a dial pointer mounted component that does not completely obscure the dial or dial pointer and a meter index cover 230 that permits a sensor 234 to be mounted near the dial pointer 214 and to sense the movement and or passage of the pointer 214. Advantageously, the movement and/or passage is sensed in a non-contacting manner so that there is no interference with the existing meter operation.

Figure 5:
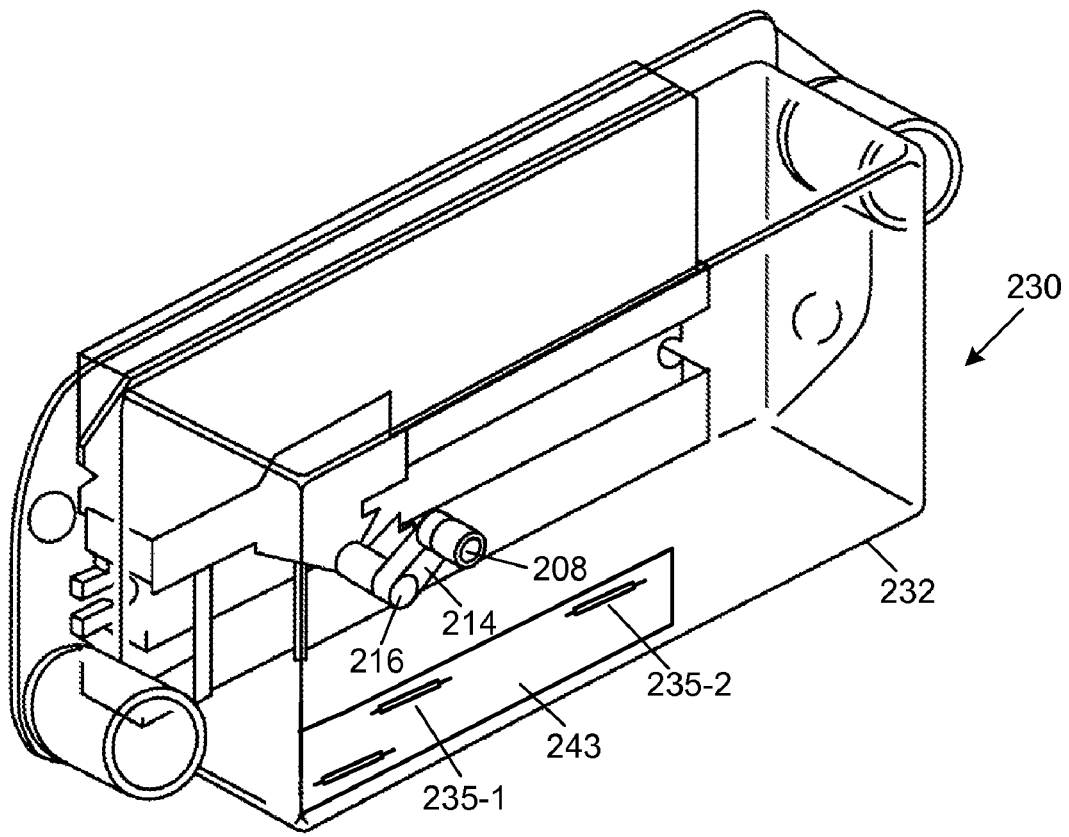
FIG. 5 is an illustration showing an embodiment of a sensor assembly including showing the interaction of an index pointer mounted magnet and printed circuit mounted switches.
Figure 6:
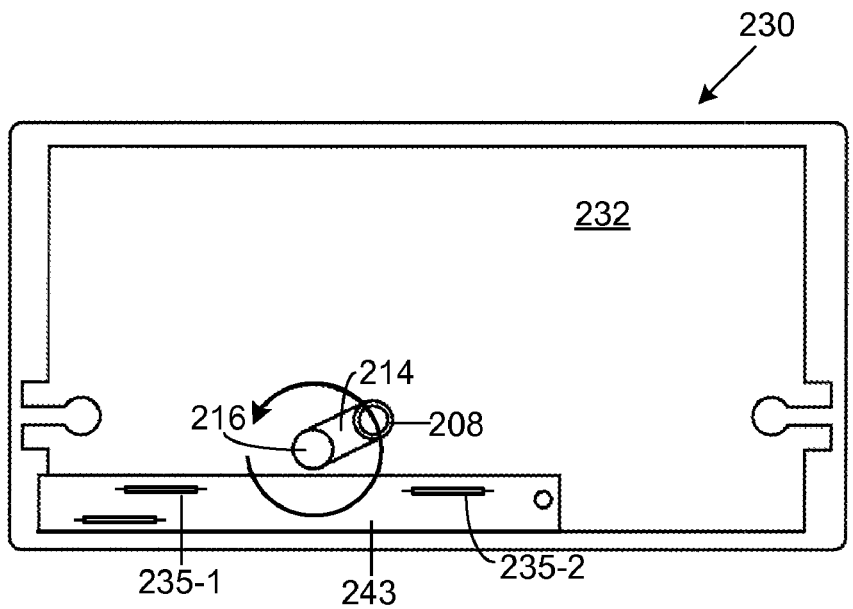
FIG. 6 is an illustration showing an embodiment of a sensor and its relationship a magnet moving past switch in the sensor.

In one non-limiting embodiment, the sensor 234 includes a printed circuit board 243 that advantageously includes at least one switch and as many as three switches. The or each switch may be mounted on a mount different from a PC board if desired, but use of the PC board 243 is advantageous as it also permits forming connections between the switch or switches and the wires, flexible printed circuit board connectors, or other conductors to the AMR electronics module 236. At least one switch 235 is needed to sense the passage of the cap 216 carrying magnet 208 through its magnet rotation arc as illustrated in FIG. 5 and FIG. 6.

When the magnet rotates past the switch or switches 235, they include at least one movable magnetically sensitive portion 237, and that movable magnetically sensitive portion 237 is urged, pulled, pushed, or forced toward another movable or stationary portion or contact to form an electrical connection and close a circuit. Whether the motion is a pushing or pulling will depend on the orientation of the switch contacts, any magnetization of the materials, and in some instances on the polarization of the magnet and its relative orientation in the cap carrier. In alternate embodiment, the geometry may be modified so that the connection which may normally be closed is opened. As it may usually take a small period of time for the magnet to rotate in its arc past the switch or switches so that the contact is maintained (or alternatively broken) for a period of time, this switch indication is very resistant to noise.

Figure 7:
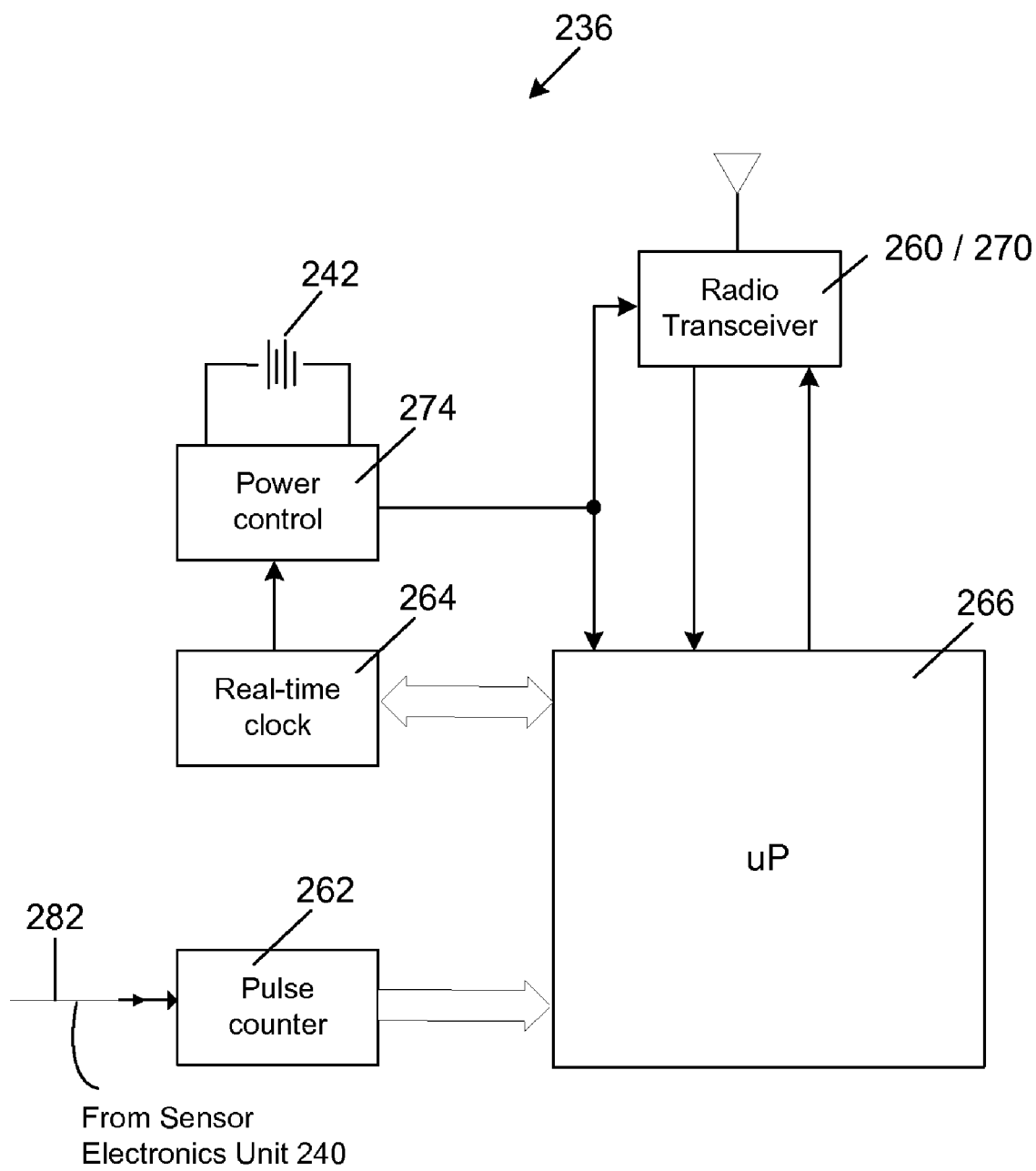
FIG. 7 is a schematic diagram showing an example of the AMR electronics module including a radio transceiver unit, and a sensor electronics unit.

With reference to FIG. 7, in one non-limiting embodiment, the AMR electronics module 236 includes a radio transmitter unit 260 and a radio receiver unit 270 (or the radio transmitter and radio receiver may be integrated as a radio transceiver 260/270), a sensor electronics unit 240 for interacting with the sensor 235 and including a counter unit 262 for counting the number of times the index pointer with it's attached magnet 208 (or metal) have passed the switch 235, a real-time clock 264, a battery 242, a power control 274, and a microprocessor 266 and memory (preferably non-volatile memory) for storing the count or a value related to or associated with the count so that the gas consumption may be stored. Non-volatile memory storage is preferable so that in the event the electronics module or the battery 242 or other energy stage device fails, the meter reading may still be obtained. It may also be appreciated that the inventive retrofit device and structure do not prevent a conventional manual or human visual reading of the meter based on the meter index dials and pointers or optional mechanical digital readout.

It may also be appreciated that although the AMR module is described as a retrofit device for meters that have existing conventional mechanical meter indexes, these AMR modules may be installed on new meters that have not yet been placed in the field. In such instances, a new meter index will be placed on the meter and then the AMR module will be added as described elsewhere herein.

Figure 8:
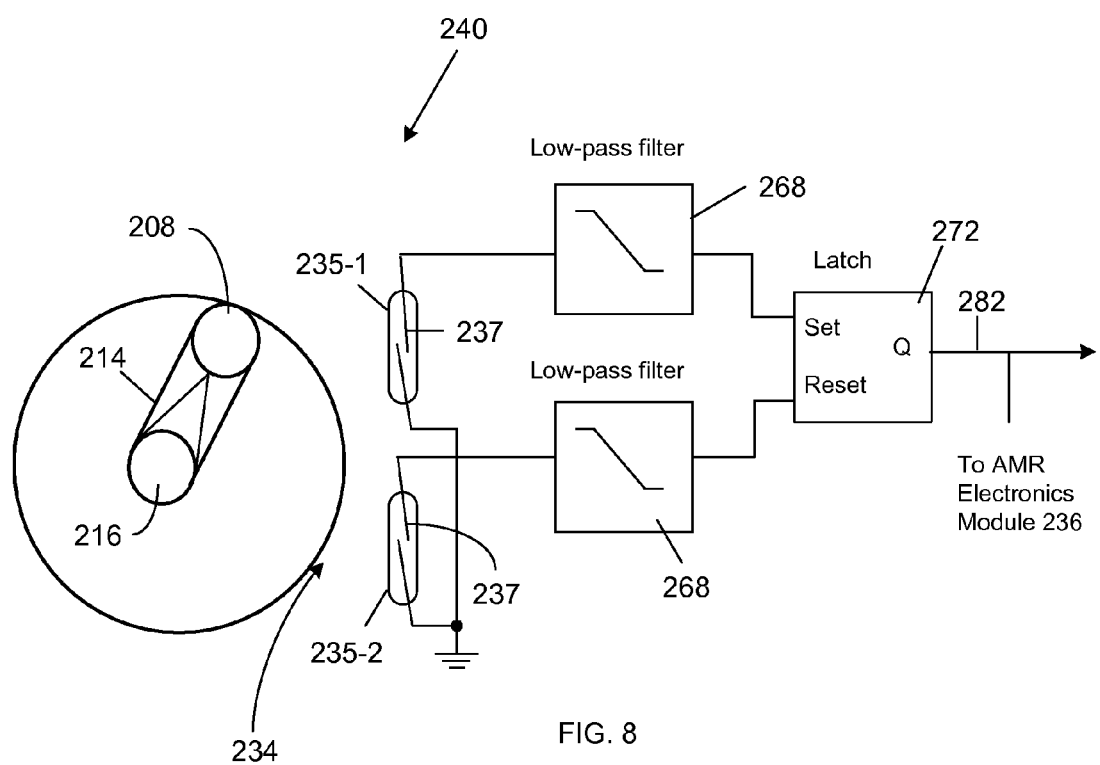
FIG. 8 is an illustration showing a sensor and the sensor electronics and logic in the AMR module associated with receiving signals from the sensor and generating a count value from the sensor signal according to an embodiment of the invention.

With reference to FIG. 8, there is illustrated a diagram showing the sensor 234 and the sensor electronics and logic 240 in the AMR module associated with receiving signals from the sensor 234 and generating a count value from the sensor signal 282. In one non-limiting embodiment the sensor electronics 240 includes one or more reed switches 235, each coupled to a low-pass filter 268, both of which are in turn coupled to a latch 272.

In one alternative embodiment, the sensor and some or all of the electronics are combined in a module within the cover 230, but this is less advantageous because of the larger size and possibility of interfering with the magnetic sensing.

Non-limiting embodiments of the invention further provide for the inventive retrofit AMR module's electronics 236 to be positioned in the index cover 230, such as above the meter index or below it, and not behind either the index cover 230 or even more problematically within or behind the conventional index or dial assembly itself. Placement above the index cover provides for better wireless communication by a radio frequency radio so that the meter information may be communicated to an external receiver and so that radio frequency commands sent to the meter AMR module may be received without interference of shielding from the meter or meter index.

In non-limiting embodiments, the entire inventive retrofit module assembly 202 may advantageously be mounted to the same mounting positions or holes that were used to mount the index original cover 110. Where different meters 104 have different hole or mounting patterns or holes, a different replacement cover 230 with attached AMR electronics module may be fabricated as there are only a limited number of meter types and patterns.

In one non-limiting embodiment, the invention includes an additional optional activation sensor at or near the inner surface of the AMR electronics module 236 that permits a technician to activate the AMR electronics module 236 by passing an external magnet near the external surface near the activation sensor. The means that the inventive retrofit AMR module 202 and particularly the electronics module 236 maybe activated without requiring any external on-off type switch or opening for such on-off type switch that may introduce contaminates into the module, or in the event of gas leakage, that would or might present an ignition spark issue because the electronics are maintained in a sealed enclosure with appropriate sealant and/or gasketing provided between any joints. Furthermore, the internal voltages and currents are very small so that even if gas were to enter the retrofit module there is virtually no explosion danger.

In one embodiment, the electronics module has a base portion that is directly attached, fastened, or formed integral with the cover 230, and a top portion that is fastened to the base portion with screws, clamps, or other fastening means. The base and top portions are advantageously detachably attached so that the electronics 240 may be placed in a cavity or receptacle in the base portions and then covered with the top portion. Providing a detachable top is advantageous for performing rare service in the field to repair or replace the electronics and to replace the battery. Advantageously the sensor 234 and electronics 240 are configured to be energy conserving so that battery replacement is rare and infrequent.

In any of these embodiments, the sensor 234 along with its coupled electronics module 240 detects and therefore tracks the position of the magnet 208 (or metal in the alternative embodiment) on the proving dial pointer 214 and relays or communicates the signal information via an electrical wire or wires 244 to the AMR electronics module 236 to track the gas consumption reported by the meter. This results in several advantages. First, there are fewer steps than conventionally used in the industry standard method for retrofitting conventional AMR modules to gas meters. Second, there are lower labor costs for such retrofits and the work can be performed by a person with less training or lower skill level. Third, there is an extremely low likelihood of errors in the retrofit process that might lead to damaged hardware, misalignment of the installed retrofit equipment, and/or inaccurate meter readings. Fourth, there is virtually no need for return visits to the customer site to fix retrofit errors, thereby further lowering labor costs. Fifth, there is a greatly reduced chance of lost revenue to the utility company as a result of improper retrofit installation or damaged meter equipment. Sixth, there is a greatly reduced chance for problems that would require attention by customer services. Seventh, there is very easy access to the inventive AMR module's battery for battery change-out without any need to redo the installation of the AMR meter index pointer coupling and only a need to open a cover on a separate AMR electronics module 236 to change the battery. Eighth, there is significantly improved radio-frequency (RF) characteristics for transmitter and receiver electronics in the AMR electronics module because the AMR module's electronics are positioned in the index cover above the meter's index and not behind it, and usually above the metal casing of the meter itself so as to provide a better view of the sky for transmission and reception. Other advantages will be apparent from the description provided here.

It may be appreciated in light of the description provided herein, that the inventive retrofit device, method for retrofit, and retrofit device and device operation, provides for extremely fast and highly reliable, virtually error free gas meter retrofits. This is so at least in part because the retrofit technician, who may now be a fairly low skilled worker, does not have to remove the existing gas meter index mechanism from its existing position on the gas meter, thereby reducing the number of steps in the retrofit process and lowering retrofit labor costs. The process merely involves removing the existing meter index cover, place a magnet carrying piece over the appropriate predetermined one of the index pointers (without stopping meter operation), and replacing the original cover with the AMR retrofit unit which will advantageously attach at the same attachment location and include the new transparent cover, and sealed electronics module (including sensor electronics, radio transmitter and receiver (or radio transceiver), and internal battery supply). In one non-limiting embodiment, the sealed electronics module may be preactivated and not require any additional installation. In another non-limiting embodiment, the electronics module may include an internal activation switch or sensor that may be activated by physically moving a magnet across an exterior surface of the electronics module. This additional activation step is simple and provides a longer shelf life and battery life since no battery power will be consumed until the retrofit AMR module is installed in its field location. Alternatively, other types of switches or activation may be used but are disadvantageous if they might permit tampering or switching the electronics on and off by unauthorized persons, or subject the internal electronics to environmental contamination.

It will be appreciated that this retrofit procedure may also be applied to new gas meters that have not yet been installed in the field or to used gas meters that are going to be redeployed in the field. Furthermore, if the gas meter does not yet have a meter index unit installed, this meter index unit installation step may be added prior to performing the new AMR unit installation.

It may also be appreciated in light of the above description, that embodiments of the AMR electronics module and battery may be a part of, formed integral with, integrated with, or attached to the inventive index cover. The AMR electronics module and battery may alternatively be a separate unit coupled to the cover carrying sensor by wires or other electrically conductive means, however, this is someone less advantageous than providing a single unit and somewhat complicates the installation, though still providing advantages over conventional retrofit devices and methods. Embodiments of the index cover may also have the perimeter mounted read-switch integrated into the enclosure for activation of the electronics as described. This may simply be for closing a switch for coupling the battery to the other circuits. It may also separately provide a reset of the internal electronics which may occur as a separate step or as part of a power-on cycle. In one non-limiting embodiment, the installation technician may optionally but advantageously conduct a test of the operation prior to leaving the installation site. This may for example include testing the radio receiver and transmitter using a handheld device for this testing and may or may not require or benefit from use of the network infrastructure with which the AMR module is intended to operate.

The integration of the sensor carrying cover with the electronics module portion may be at the time of manufacture or later, but before the retrofit module is taken to the field for installation. The sensor read-switch advantageously includes ultra-sensitive material for sensing the position of the magnet and thereby sensing or monitoring the position of the dial pointer itself to accurately track gas consumption. Furthermore, the AMR module's battery is easier to access by placing it in an enclosure separate from a region between the index mechanism and the gas meter itself, which reduces on-site visit time by a field technician and reduces labor costs, and the RF characteristics of the inventive AMR module are improved because of its location outside of the index area and in at least some non-limiting embodiments at or near a top portion of the meter as it is installed in the field. The AMR battery, electronics, and the portion of the AMR electronics module are described in additional detail elsewhere herein.

Figures 9A, 9B:
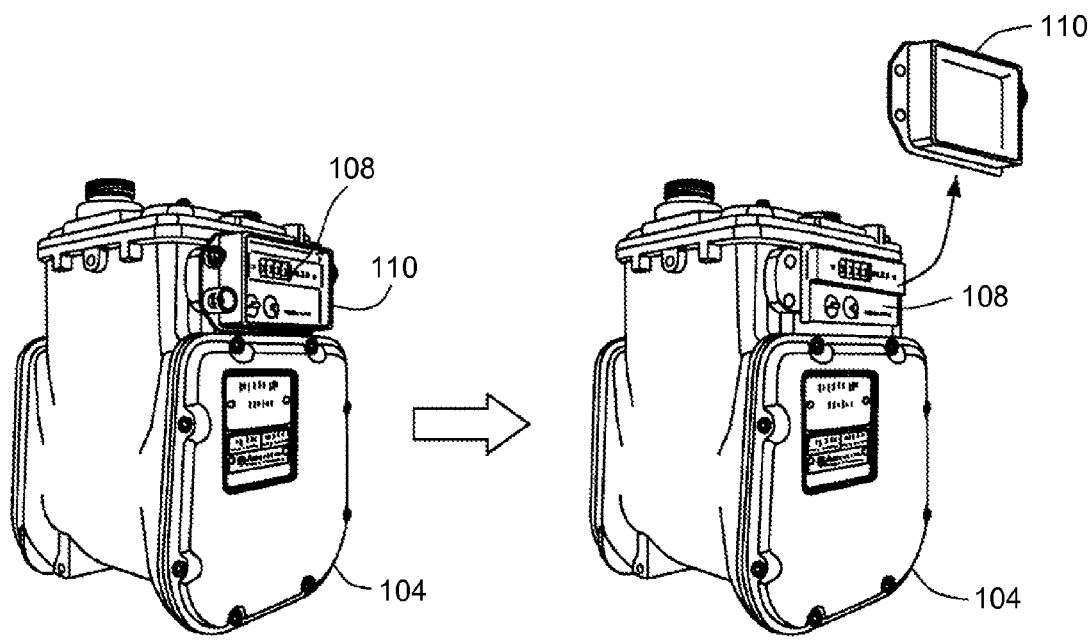
FIG. 9 is an illustration showing a stage in the retrofit of an AMR assembly to a conventional mechanical gas meter according to an embodiment of the invention.

With reference to FIG. 9-FIG. 11 attention is now directed to one exemplary embodiment of the method for retrofitting the inventive AMR module. It will be apparent from the method described here that the inventive method vastly simplifies the retrofit over the procedure conventionally performed and required.

A. With the gas meter 104 in place, remove the meter's index cover 110 but leave the meter index 108 in place without disengaging it from the meter 104 or from the index drive mechanism (See FIG. 9).

B. Attach magnet 208 carried by a magnet attachment means such as the cap 216 to the meter index's proving dial pointer 214 (See FIG. 10). Typically the magnet will be attached to the cap 216 in advance, such as at a place of manufacture or otherwise, and need not be a step in the meter index retrofit procedure.

C. Mount the inventive retrofit AMR unit (See FIG. 11), which includes the index cover 230, AMR electronics module 240 including the battery, to the meter so that the inventive index cover replaces the old or original index cover 110. This mounting may usually use the same index cover to meter mounting means as the original index cover, although in some instances where for example attachment screws are used, a different length screw may be needed if the new cover extends the distance from the meter itself, however, in most instances no additional screw length will be required as the thickness of an index cover attachment flange is the same or substantially the same thickness as the original index cover mounting flange.

It may be noted that the exemplary embodiment of FIG. 10 also illustrates the manner in which the snap on cap 216 may be slipped over the proving dial pointer 214 and the magnet 208 added to the cap either before (preferably) or after the cap is put in place. Advantageously, the magnet is assembled to the cap during a prior manufacture step. The magnet 208 may also or alternatively be integrally formed with the cap so that no additional assembly is required, such as being molded into a plastic cap. Other means for attaching the magnet to the index pointer may be used. Typically the meter index dial on to which the cap 216 is inserted move very slowly and usually imperceptibly during the second or two that it takes to apply the cap 216 over the pointer 214. Unlike the conventional retrofit process, it is not necessary to align the index drive mechanism while the index drive is turning, so there is no danger of misalignment of the keyed shaft with the index assembly.

Furthermore, it is apparent from the illustration in FIG. 11, that the afore described sensor 234, such as the magnetic switch based sensor, is embedded in or otherwise fastened or attached to the new replacement index cover 230. In addition, the AMR electronics module 240 may advantageously be positioned vertically above the index cover assembly in at least some non-limiting embodiments where the original meter construction permits such placement to provide improved radio frequency transmission and optionally receive characteristics for communication with an external radio for performing the automated reading operations. Optionally, the AMR electronics module 240 may be a separate unit than the sensor carrying index cover 230 with the wires 244 extending between the two units for better placement of the radio transmitter and radio receiver. Although the voltage is relatively low, the wires may advantageously have some shielding for better noise immunity and to reduce the possibility that a wire will be cut or damaged in the field. The placement of the AMR electronics module at or near an upper portion of the meter also enhances battery access for the rare occasions when battery replacement is needed. In one non-limiting embodiment, the AMR electronics module 240 may be attached to or formed integral with the index cover 230 during manufacture, and is advantageously a single assembly when it reaches the field for installation. Advantageously, retrofit assembly 241 which includes the AMR electronics module 240 and the index cover 230 are formed of a relatively strong material that will withstand heat, cold, and environmental weathering conditions.

In one non-limiting embodiment the AMR electronics module 240 houses a battery 242 or other power source an electronic circuit such as in the form of a printed circuit board or card 243. In one non-limiting embodiment the electronic circuit or printed circuit board or card 243 is disposed in one compartment and battery 242 or other power source is disposed in a second compartment. When radio transmitter and radio receiver (or combined transceiver) is provided, transmit and receive (or combined transceiver) antenna(s) are provided. Each antenna is sized and oriented according to the radio frequency and transmit receive characteristics. As the (or each) antenna is typically enclosed within the electronics module 240, the electronics module housing material is advantageously made of a material that does not significantly attenuate the radio frequency signal. This separation is primarily for purposes of mechanically separating the battery from the circuits and may also provide some better circuit performance by keeping the battery with its metallic elements away from the electronic circuits including away from the radio frequency transmitter and receiver sections.

As described, the electronic circuit includes at least one radio transmitter for sending a meter reading and optionally other information that identifies the meter so that it can be associated with a utility account and so that the gas consumption may be properly billed to that account. The electronic circuit may also include means for counting the meter dial index pointer 214 revolutions generated by the sensor 234 and for storing a count such as storing in a memory that may be translated into a meter reading. Advantageously the electronic circuit will include a non-volatile memory that will store the count or count associated values in memory in the event of battery failure or exhaustion. Optionally, means may be provided to monitor the battery strength or remaining capacity so that replacement may be made before exhaustion or so that a final meter reading may be obtained before battery exhaustion. The battery strength or capacity monitoring means might include voltage and/or current measurement circuits, a count of the number of transmissions and/or receptions made, an indication of the total operating time, and estimate until the time of replacement, or other indication. Battery conserving techniques may advantageously be used to conserve battery power. For example, the radio may only be turned on according to a predetermined or dynamically determined routine (perhaps only a few milliseconds to a few seconds per day or per week or per month) when a meter reading is scheduled and/or to receive instructions or updates if such instructions or updates are sent. Furthermore, portions of the electronic circuits that are not directly related to counting rotations sensed by the magnetic sensor may be turned off or put into some suspend state. The different circuits or sub-circuits being enabled or disabled when not intended to be used. For example, in one non-limiting embodiment, it may be useful to periodically turn on the sensor circuit and sensor circuit electronics according to some schedule that may consider such factors as an historical maximum gas usage rate so that the sensor circuit and electronics may be turn off at the end of one index pointer rotation with the knowledge that it will take at least a predetermined period of time for a new complete rotation to occur that requires a count; knowledge that the passage of the magnet past the sensing circuit takes a different predetermined minimum time so that even with a 10%, 20%, 30%, 40%, 50%, 60% or some other suitable sensor electronics on-off duty cycle, the passage of the pointer carried magnet may be reliably detected. Furthermore, the radio transmitter or receiver may be powered on separately from the sensor circuit so that it or they are only on when actually transmitting or receiving.

In one non-limiting embodiment, a wire or set of wires or flexible printed circuit connectors electrically connect the sensor 234 including the one or plurality of switches 235 from the embedded or attached sensor 234 to the electronics module 240. The electronics module 240 may advantageously have a cover that is attached by removable fasteners, such as screws, spring clamps, clips, or the like fasteners so that the battery 242 may be serviced or replaced if and when needed, and although failure of the electronics circuit module 240 would not normally be expected, to repair or replace it should the need arise. In the embodiment illustrated, a top cover portion is provided that attaches to a base portion via two screws. Other embodiments may use a snugly fitting snap on attachment. The top cover may include means for reducing the possibility of water into the housing such as an o-ring, close fitting overlapping groves, sealant or gasket material, or other means or combinations of these. The cover advantageously is fitted to the bottom potion to substantially seal the electronics and battery from the weather and from filling with water. Gasketing may optionally be provided, but for a top and bottom that are made from a polymeric material, and an orientation to prevents pooling or leak down through the joint, the fit provided by the two pieces and the fasteners may usually be sufficient without additional gasketing material or sealant.

In one non-limiting embodiment, one or more tamper detection circuits or sensors may be provided to detect and optionally record and/or transmit a tamper alert following the removal of the retrofit assembly 241 or portion thereof, or tampering of the electronics module.

While embodiments of the magnet 208 (or metal) carrying slip-on or snap-on cap 216 or fitment for the index dial pointer 214 have been shown and described elsewhere herein, FIG. 12A and FIG. 12B illustrate two different perspective views of an exemplary embodiment of such cap 216. FIG. 12A illustrates the slip on cap 216 with the magnet 208 in an exploded perspective view and FIG. 12B illustrates the cap 216 with the magnet installed. As illustrated in these drawings, the lower portion (as shown) includes a recess for slipping over or snapping onto a convention index dial pointer and pointer shaft without interference. It also includes an elongated portion that would be aligned with the dial pointer 214, and an upwardly or outwardly opening cup or recess 215 for carrying the magnet 208. The outward projection of the cup may be selected to separate it from the face of the index dial and to place it in close proximately to the sensor 234. The magnet may be slipped into the cup or recess held by friction fit, by using some snap attachment, or an adhesive may be used. The magnet may be integrally formed into the cup or recess of the cap or other fitment during manufacture so that subsequent attachment is not required. Advantageously, the magnet is attached to the cap before the technician enters the field so that this operation need not be of concern at the time of retrofit installation. Advantageously, the sensor and/or the magnet includes or utilizes a sensitive or ultra-sensitive magnetic material or non-magnetic material that is able to sense the passing magnet so that the combination are capable of sensing the rotation or passage of the metal past the magnet or the magnet past the metal (relative motion between a magnetically attractable or repulsive material and a magnet).

Figure 13A:
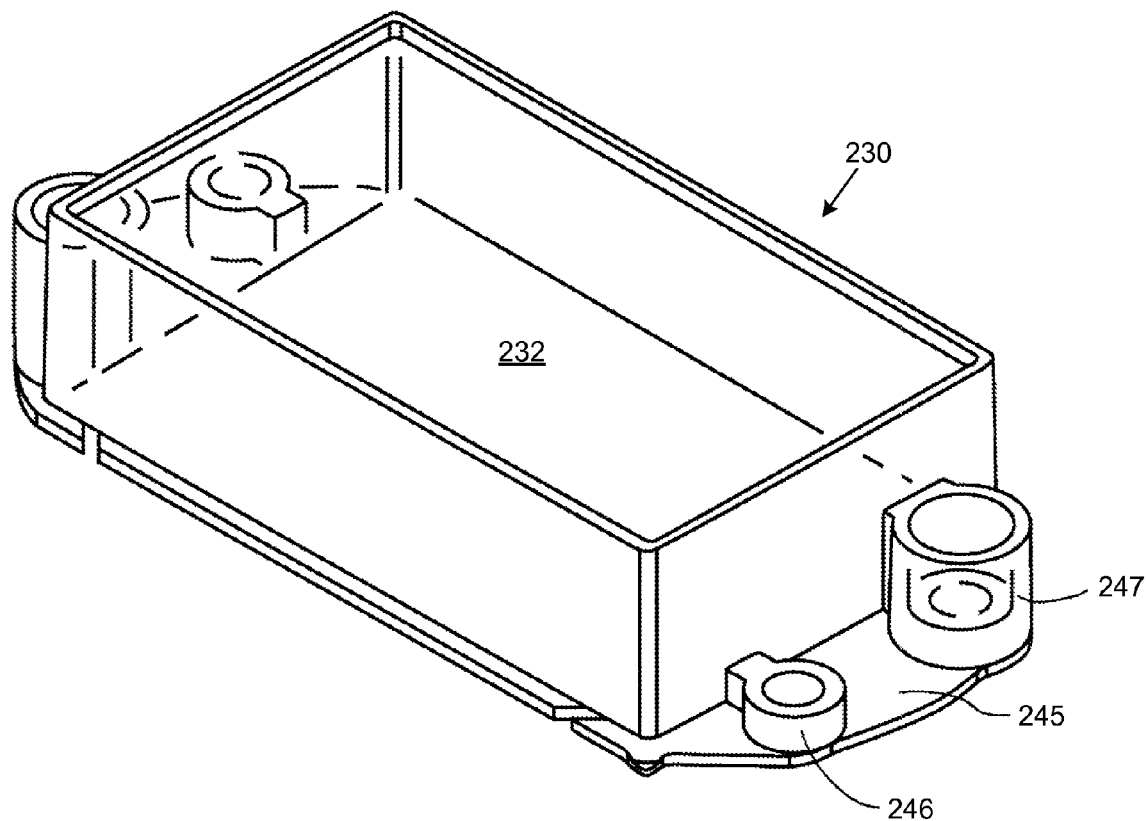
FIG. 13A illustrates a view looking from the outside of the cover and FIG. 13B illustrates a perspective view looking essentially from the inside of the cover to the outside.
Figure 13B:
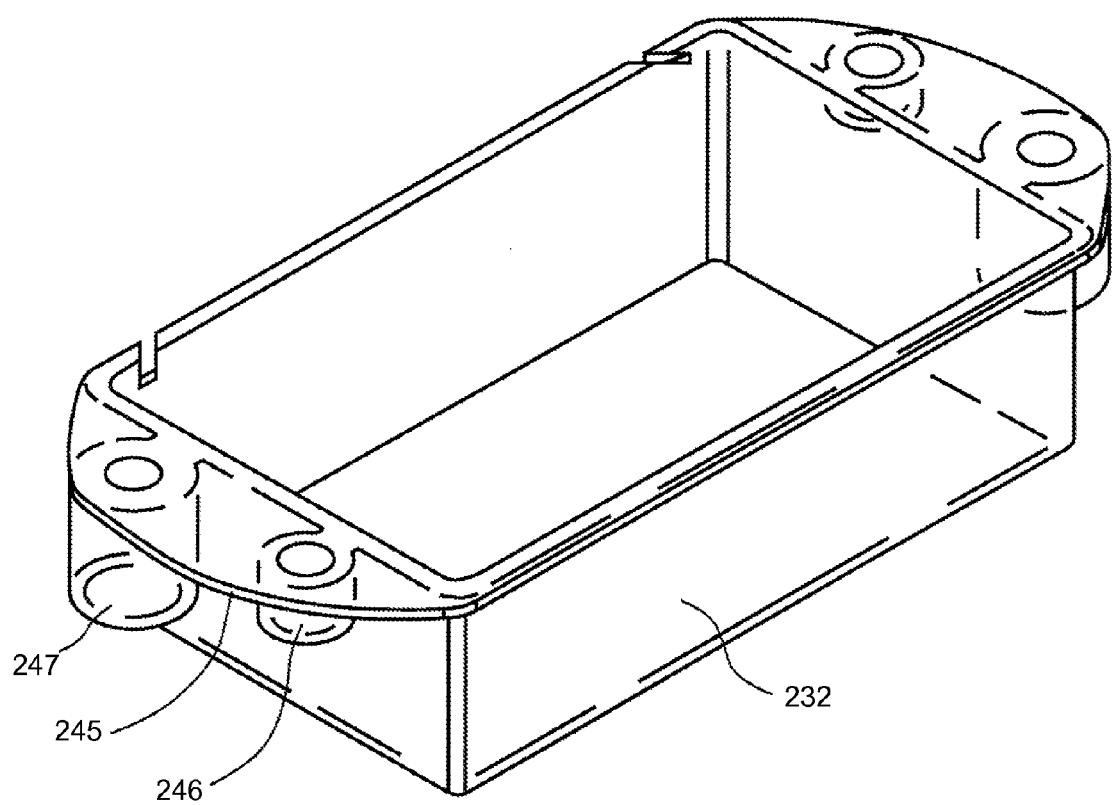

In like manner, while embodiments of the index cover of the inventive retrofit device have been shown and described, FIG. 13A and FIG. 13B illustrate two different perspective views of one such inventive retrofit index cover 230 in greater detail, wherein FIG. 13A illustrates a view looking from the outside of the cover and FIG. 13B illustrates a perspective view looking essentially from the inside of the cover 230 to the outside. This cover is advantageously formed of a plastic or polymeric material and at least a portion is advantageously formed of a transparent material so that if required or desired the continuing operation of the meter index dials may be visually observed and even a manual meter reading taken if desired or required for any purpose. Materials such as Lexan have good properties and may be used among other materials. As at least a portion the index cover is advantageously transparent (particularly when there is a requirement or desire to see the index pointer moving) and the AMR electronics module need not be transparent and may have additional reasons not to be transparent such as being made form a material with different mechanical properties, the index cover 230 and the AMR electronics module 240 portion may be joined using fasteners, adhesives, welding, remolding, or by other means for attaching known in the arts. A transparent window 233 may be formed in a non-transparent index cover 230 either alone or along with the AMR module portion 240 so that the retrofit assembly 241 has both a transparent window portion and other non-transparent portions. In the embodiment of FIG. 13A and FIG. 13B, an attachment flange portion 245 along with through holes 246 and 247 for receiving screws that will attach to mating threaded holes in the meter body. In one non-limiting embodiment, the electronics module component 240 of the retrofit assembly is made of a non-transparent a structurally tough material and includes a frame portion that aligns and holds the index cover portion as it is attached to the meter. The AMR electronics module 240 may therefore be assembled to the index cover portion at the time of installation of both to the meter. In at least one non-limiting embodiment, the sensor 234 may be detachably connected to the electronics module with an electronic connector for the wires 244, or the wires may be fixed to the electronics module 240 and to the sensor 234 with the sensor having a friction fit, snap in fit, or other easily fitable assembly to the index cover 230. For example the sensor assembly 234 may have a ridge (or depression) that mates with a depression (or ridge) molded into the inner surface of the transparent cover 230.

Figure 14:
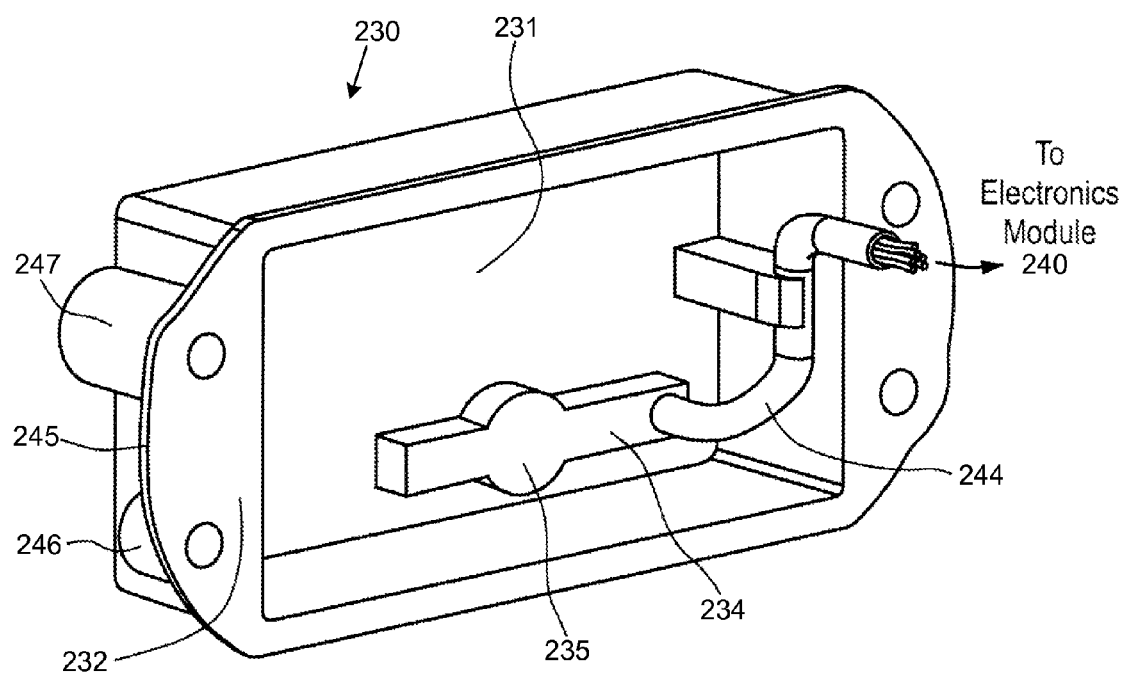
FIG. 14 is an illustration showing further exemplary embodiments of an index cover assembly and showing the sensor assembly embedded within or attached to an inner surface of the index cover with wires connecting the sensor to the electronics module (not shown), as well as an alternative embodiment of the magnet carrier in somewhat greater detail.

FIG. 14 is an illustration showing further exemplary embodiments of an index cover assembly 230 and showing the sensor assembly 234 embedded within or attached to an inner surface 231 of the index cover 230, with wires connecting the sensor to the electronics module 240. The sensor assembly 234 may be attached to an external surface of the index cover 230 assembly so long as it is close enough to have an interaction with the magnet carried by the cap, but this is not preferred because of the possible negative environmental influences, the possibility of tampering of the sensor such as removing and then reattaching it to the meter, and the physical and electrical integrity of the retrofit assembly. FIG. 14 also shows an alternative embodiment of the magnet carrier in somewhat greater detail. It may be appreciated that various designs may be utilized and may vary depending upon the size and configuration of the index pointer and its shaft.

Figure 15:
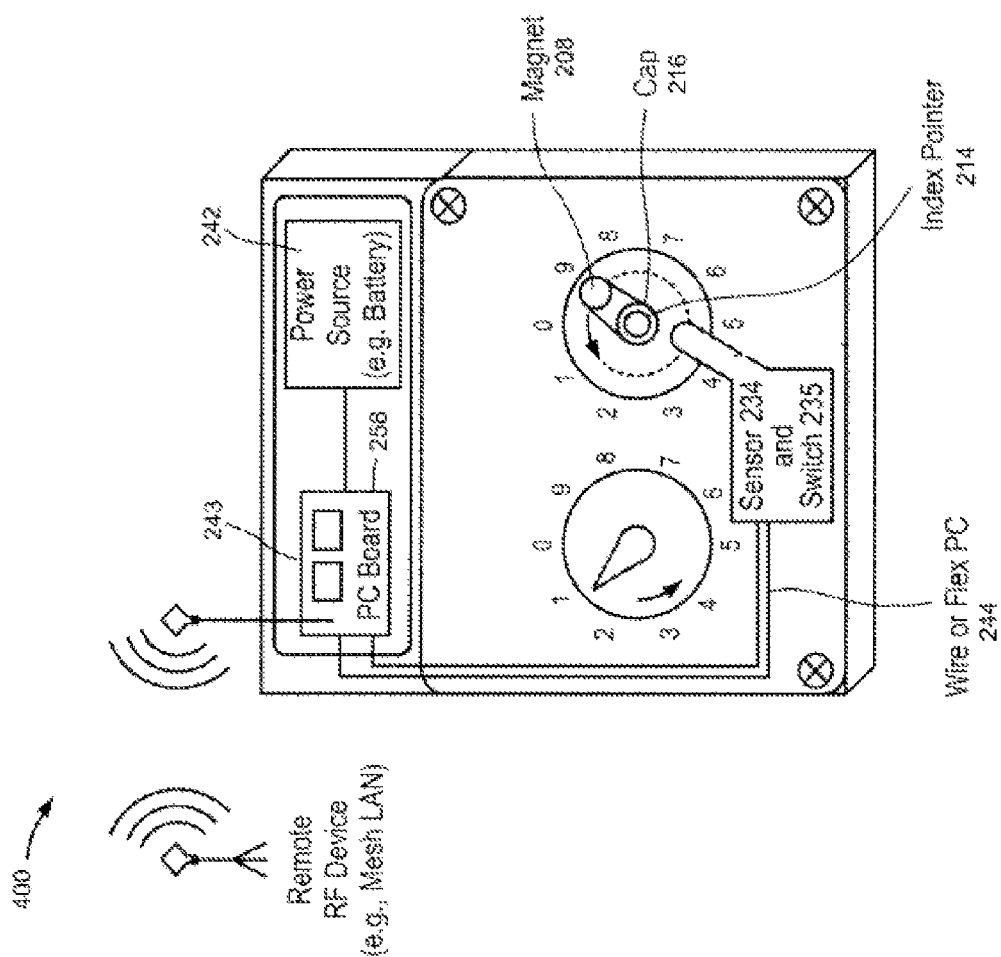
FIG. 15 is an illustration showing a line drawing showing a non-limiting embodiment of the complete retrofit assembly including the index cover, electronics module (in partial cross section showing the electronics circuit and battery.

FIG. 15 is a line drawing showing a non-limiting embodiment of an exemplary retrofit assembly installed on a meter 400.

In the exemplary embodiment, after removal of the existing conventional index cover 110, a cap or other fitment 216 is slipped over or snapped onto the existing index shaft and meter index dial pointer 214. The cap 216 carries a magnet 208 that interacts with a magnetically sensitive sensor 234 containing at least one switch 235 or other sensor that undergoes a change in state that can be detected on each revolution (or in an alternative embodiment, carries a metal piece that interacts with a magnet within the sensor containing the switch). When the magnet (or metal) 208 passes by the sensor 234, the switch 235 state is changed from open to close (or from closed to open) to indicate the rotation of the dial. A plurality of sensors and/or magnets may be used but are not typically necessary. For meters that have a plurality of dials indicating different multiplies or scales of gas volume used, it is typically sufficient to modify only a single dial index although modifying more than one is not prohibited.

A wire or flexible printed circuit board (PC board) 244 may be used to connect the sensor 234 including one or a plurality of switches 235 to the electronic circuit(s) 240 usually including a battery 242 powered (power source) PC board 243. The PC board includes or carries electronics that receive the change of switch states from the sensor 234 and develop a count value or increment a counter 262. The counter value is stored in the electronic circuit, such as in a register or memory, until the meter is read remotely using the radio transmitter/receiver section of the circuit. Usually the counter values or a corresponding meter reading or volume of gas (for example, cubic feet or the like measurement) will be stored along with a date and possibly time so that the counter value or corresponding measurement may be stored for a predetermined time or even for the life of the electronic circuit or until a storage capacity is exceeded. Where gas consumption is billed at varying rates for different days of the week, times of year, time of day, or according to other calendar and/or other demand pricing schedules, calendar information (day, time, month, etc.) may be stored along with the meter reading. It may also be noted that where time of day and/or other variable schedule or demand based pricing is implemented, it may be advantageous to select and use a meter index pointer that moves at a sufficiently high rate that consumption on a per hour or other basis can be measured.

The PC board 243 also includes or carries a radio for communicating the meter reading and other information, such as for example information identifying the meter uniquely to an account to which the utility or gas is to be billed, and any date and time information or information relevant to demand pricing. In at least one embodiment, the information optionally includes a geographic positioning system (GPS) data (or a GPS receiver to actively determine a current meter location) so that the meter location may be identified as an aid to user identification, location for service, or to detect and prevent meter substitution and any attempted meter fraud.

A remote RF device, or a plurality of devices or networks or systems may be operated to communicate or relay data or commands between the meter AMR unit and an external entity.

Various mechanical features of the gas meter retrofit device having been described, as well as the simplified retrofit procedure, attention is now directed to aspects of the AMR/AMI communication and infrastructure that permit the meter to be interrogated or read and optionally to be controlled, including for example having the meter reading initiated by a external entity, detecting meter tampering or removal, or other features. Other aspects of this AMR/AMI communication and infrastructure are described in the above listed co-pending patent applications.

Figure 16:
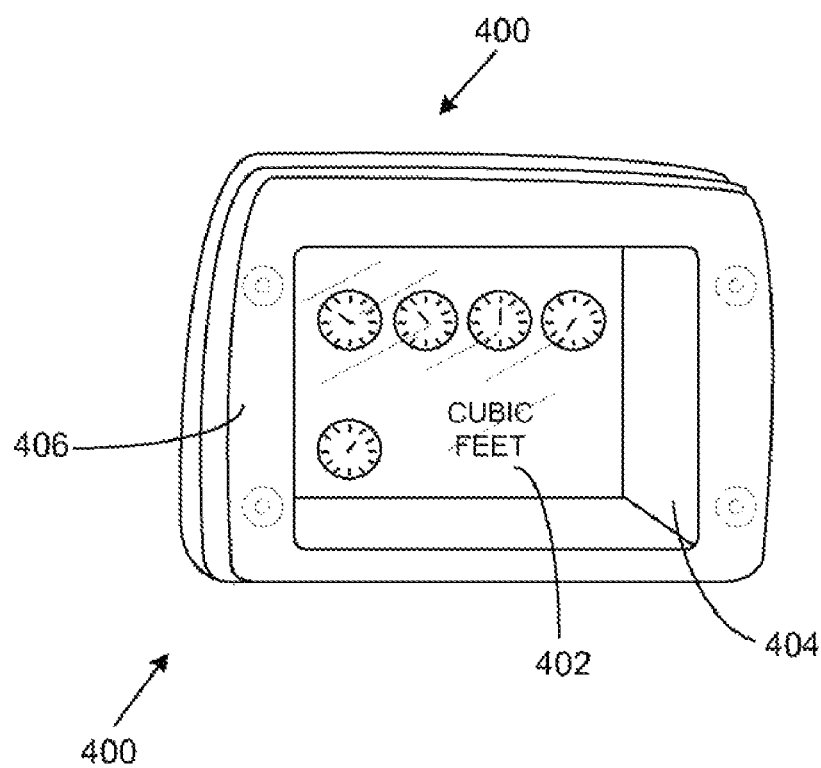
FIG. 16 illustrates an example of a first type of commercially available gas meter having an index face, a clear index cover, and a mounting bezel supporting the clear index cover in spaced-apart relationship to the index face.
Figure 17:
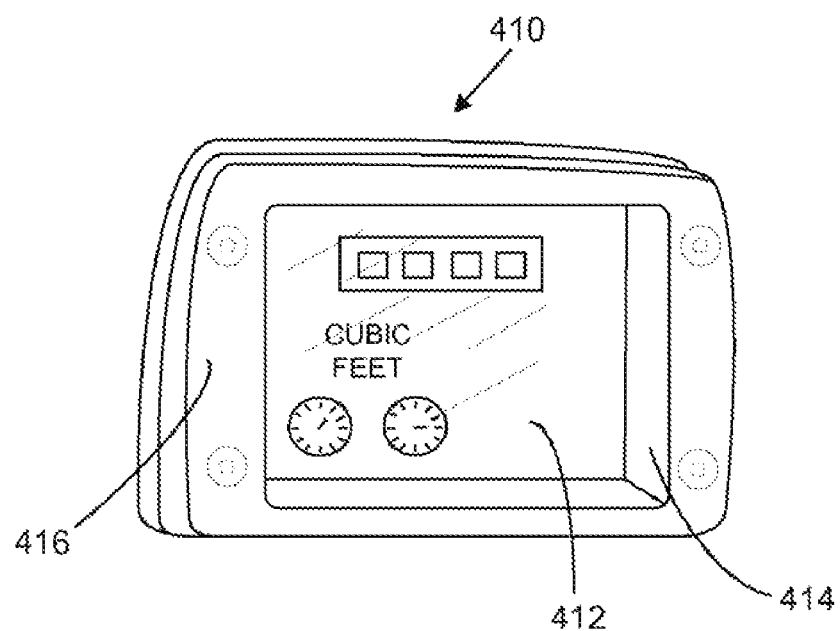
FIG. 17 illustrates an example of a second type of commercially available gas meter likewise having an index face, a clear index cover, and a mounting bezel supporting the clear index cover 404 in spaced-apart relationship to the index face.

FIG. 16 illustrates an example of a first type of commercially available gas meter 400 having an index face 402, a clear index cover 404, and a mounting bezel 406 supporting the clear index cover 404 in spaced-apart relationship to the index face 402. FIG. 17 illustrates an example of a second type of commercially available gas meter 410 likewise having an index face 412, a clear index cover 414, and a mounting bezel 416 supporting the clear index cover 404 in spaced-apart relationship to the index face 402. The mounting bezel in commercially available meters has a thickness or Z-axis dimension that differs between meter manufacturers, so the distance between the pointer on the index face and the inside of the clear index cover can likewise vary from one manufacturer to another. For example, the distance between the index face 402 and the clear index cover 404 of the first type of commercially available gas meter 400 shown in FIG. 16 is greater than the distance between the index face 412 and the clear index cover 414 of the second type of commercially available gas meter 410 shown in FIG. 17.

Figure 18A:
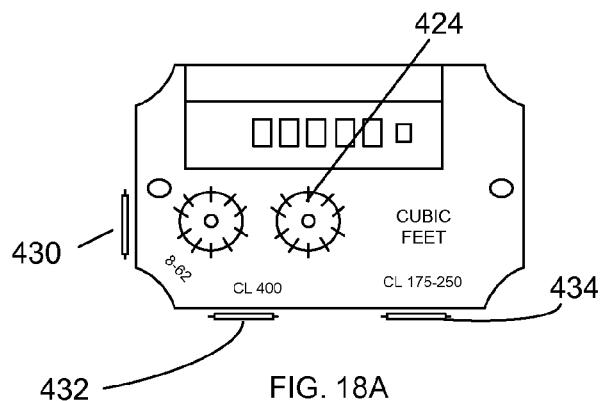
FIGS. 18A-18D illustrate examples of different types of meter index faces with proving dials and associated proving dial pointers at various locations, depending on a particular meter manufacturer's design and alternate embodiments involving placement of three sensors at locations inside the mounting bezel for each of the various meter index face configurations.
Figure 18B:
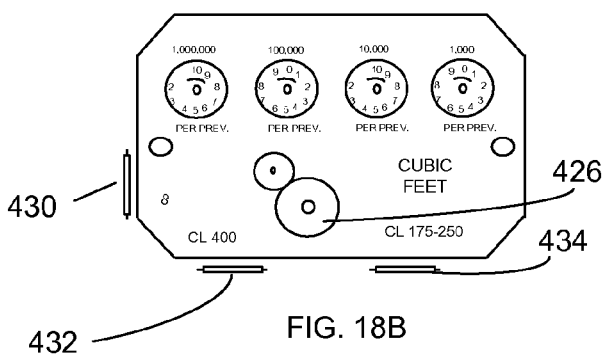
Figure 18C:
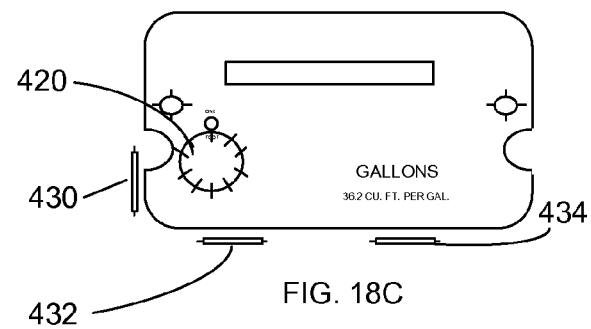
Figure 18D:
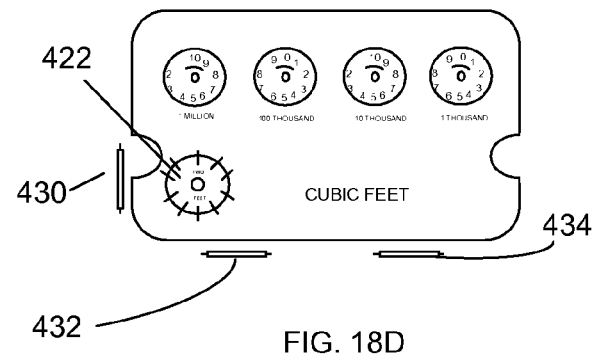

Thus, in embodiments of the invention, the distance between the proving dial pointer-mounted magnet 208 and the clear index-mounted sensor assembly 234 can vary from one manufacturer's meter design to another manufacturer's meter design. An aspect of embodiments of the invention addresses this variation in distance is by providing different magnet holders for different meter designs. Further, depending on a particular meter manufacturer's design, the proving dial pointer 214 on which the magnet 208 is positioned can be located anywhere on the index face 206. FIGS. 18A-18D illustrate examples of different types of meter index faces with proving dials and associated proving dial pointers at various locations, depending on a particular meter manufacturer's design. For example, the proving dial 214 of the pointer on which the magnet is positioned can be located off to one side of the index face at 420 as shown in FIG. 18C or 422 as shown in FIG. 18D or more or less centered on the index face at 424 as shown in FIG. 18A or 426 as shown in FIG. 18B.

To more efficiently deal with such variations, alternate embodiments of the invention involve locating one or more sensors 235 inside the mounting bezel 406 or 416, instead of molding or gluing the sensor or sensors 235 to the inside of the clear index cover 404 or 414. In such alternate embodiments, at least one sensor and preferably at least two sensors and more preferably three sensors are located inside the mounting bezel 406 or 416 that is positioned between the clear index cover 404 or 414 and the index face 402 or 412 and spaced a predetermined optimum distance from the index face 402 or 412 and their respective associated proving dial pointer-mounted magnets. Since the distance between the index face 402 and the clear index cover 404 of the type of meter 400 shown in FIG. 16 is greater than the distance between the index face 412 and the clear index cover 414 of type of meter 410 shown in FIG. 17, the distance between the sensor or sensors mounted inside the mounting bezel 406 and the clear index cover 404 of the type of meter 400 of FIG. 16 can likewise be greater than the distance between the sensor or sensors mounted inside the mounting bezel 416 and the clear index cover 414 of the type of meter 410 of FIG. 17.

Referring to FIGS. 18A-18D, alternate embodiments involve placement of three sensors 235 at locations 430, 432, and 434 inside the mounting bezel for each of the various meter index face configurations. Positioning the sensors 235 inside the mounting bezel according to alternate embodiments enables the sensors 235 to be placed any desired distance from the index face in order to control the Z axis. It is to be understood that whether the sensor or sensors 235 are positioned inside the clear index cover 230 according to embodiments of the invention or inside the mounting bezel 406 or 416 for alternate embodiments, the sensor or sensors 235 are positioned near enough to the index face 206 or 402 or 412 that it can sense the passage of the pointer-carried magnet 208 as it travels through its arc about the index face.

An aspect of embodiments of the invention is the orientation of the magnet 208. In embodiments with the sensors 235 inside the clear index cover 230, the sensors are required to be relatively sensitive and the air gap between the magnet 208 and the sensors is required to be relatively small. However, alternate embodiments with the sensors 235 inside the mounting bezel 406 or 416 require less precision because the sensors are operative over a greater sensing area. As noted above, depending on a particular meter manufacturer's design, the proving dial pointer 214 on which the magnet 208 is positioned can be located anywhere on the index face 206 as illustrated in FIGS. 18A-18D. An advantage of such alternate embodiments is the ability to accommodate virtually all manufacturers' meter designs using only three sensors 235 positioned respectively at 430, 432, and 434, as shown in FIGS. 18A-18D inside the mounting bezel 406 or 416.

While such alternate embodiments deploy three sensors 235 at locations 430, 432, and 434 inside the mounting bezel 406 or 416, logic selects which of the sensors 235 is actually to be used in operation. For example, in alternate embodiments, sensor 235 at location 432 is always used for both the meter configurations with the proving dial 214 of the pointer on which the magnet 208 is positioned is located off to one side of the index face at 420 as shown in FIG. 18C or 422 as shown in FIG. 18D or more or less centered on the index face at 424 as show in FIG. 18A or 426 as shown in FIG. 18B. Sensors 235 at locations 432 and 434 are used together or sensors 235 at locations 432 and 430 are used together depending on the meter configuration and proximity of the pointer on which the magnet 208 is located to sensor 235 at locations 434 or 430. If it is closer to sensor 235 at location 430, then the sensors at locations 432 and 430 are used, and if closer to sensor 235 at locations 434 and 432, sensors 432 and 434 are used. Sensors 235 at locations 430 and 434 are never likely to be used together and can thus be wired in parallel.

Referring again to FIGS. 7 and 8, the sensors 235 for alternate embodiments are likewise reed switches which use virtually no battery power. When the reed switch contact 237 closes or opens as a result of proximity to the magnet 208, the pulse counter 262 records a pulse, and no energy is used any other time. Alternate embodiments utilize, for example, the latch 272. Two sensors 235 are always used, but only one of those sensors is active at one time. Since meters quite often vibrate and since only one sensor 235 is active at one time, the latch 272 assures that the sensors are sequential, so if the meter index 206 sits in one place and vibrates on one of the sensors 235, additional pulses are not counted. In alternate embodiments, the signal from the two sensors 235 at locations 432 and 434 or the two sensors 235 at locations 432 and 430 goes into the simple filtering circuit 268 and thereafter into the latch 272 to remove any vibration sensing. Next, the signal goes into the counter 262 that simply counts and is inside the microprocessor 266 for the gas meter. The gas meter is battery 242 operated so even though the power is removed from the microprocessor 266 the counter 262 continues to operate.

In embodiments of the invention, pulses are collected and a real-time clock 264 is employed which wakes up the microprocessor 266 periodically, such as once every hour on the hour. Upon awakening the microprocessor 266, the number of pulses that have been accumulated are placed in memory. That is referred to herein as an interval, so in a 24 hour day 24 intervals of data are recorded. That data is uploaded once a day and sent to the head end via radio transmitter 260, which enables looking at the usage profile of a customer. Embodiments of the invention involve a greater or lesser number of intervals, but for gas meters, smaller intervals are not necessary, and one per hour is typical, especially for commercial meters. According to embodiments of the invention, the dial that is instrumented with the magnet 208 is preferably the proving dial, which is the meter dial that has a one-to-one relationship to the drive of the meter itself. In a residential meter, for example, one revolution of the proving dial represents either one cubic foot or two cubic feet of gas depending on the particular kind of index. In embodiments of the invention, the particular volume of gas represented by one revolution of the proving dial is programmed in with a handheld programmer when the retrofit is installed so exactly what the pulses mean are known. One or two cubic feet of gas is a relatively small amount as a typical residential gas meter can operate at about 250 cubic feet per hour. Thus, one pulse for every one or two cubic feet of gas is very slow.

Such alternate embodiments locate the sensors 235 in the mounting bezel 406 or 416, and the retrofit involves removing the old index cover 110, mounting the sensors 235 an locations 430, 432 and 434 inside the mounting bezel, and mounting the magnet 208 on the pointer 214 of the proving dial 212 by snapping the magnet on the pointer 214. The same index cover 110 can be reused, but a utility may typically elect to use a new index cover because the clear plastic of which such index covers are made tends to turn yellow from exposure to sunlight over time, and the plastic index covers are very inexpensive to replace. It is not necessary to remove the index mechanism for the retrofit as it is with existing art retrofit methods.

Figure 19:
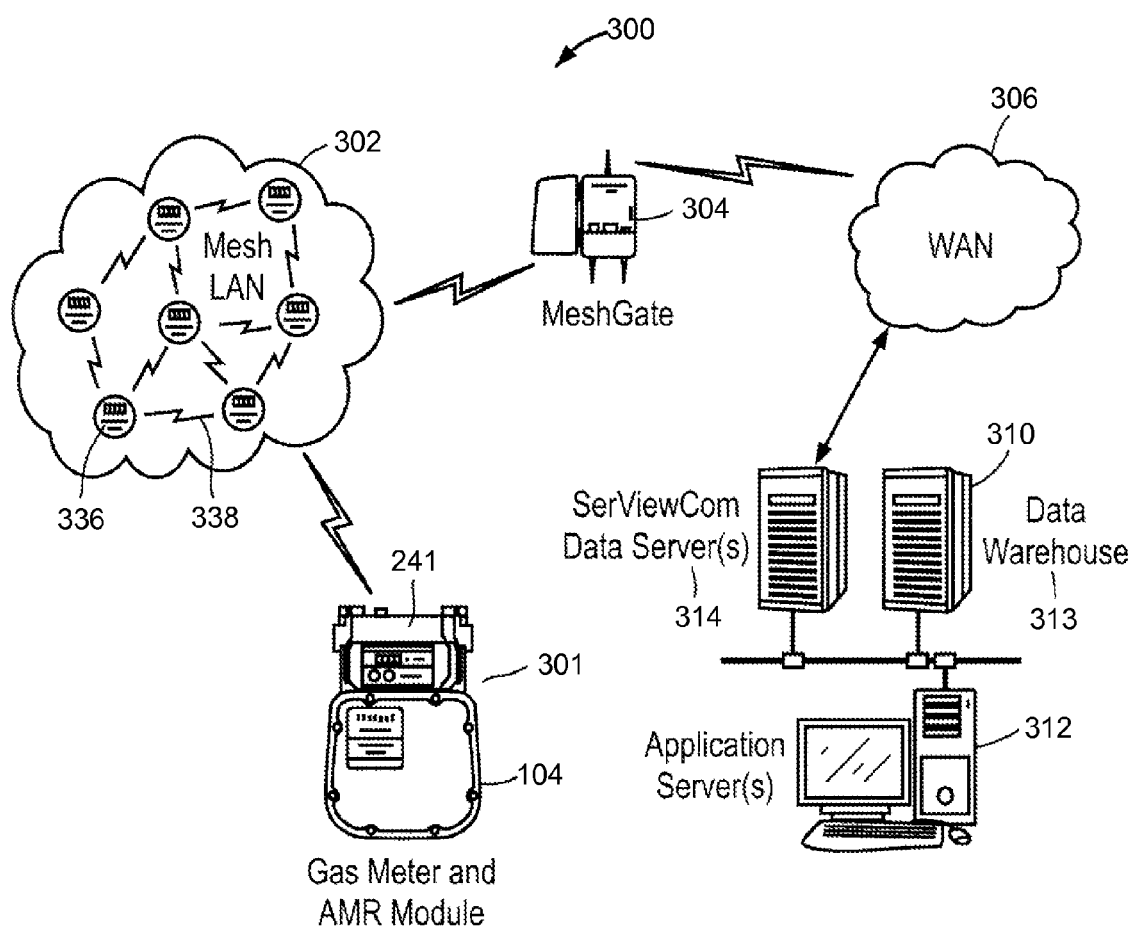
FIG. 19 is an illustration showing an exemplary AMI meter reading and control system including AMI retrofitted gas meters according to embodiments of the invention.

With reference to FIG. 19, there is illustrated a non-limiting embodiment of a gas meter 301 incorporating the retrofit (or originally installed) AMR module 241 in a wireless mesh network infrastructure environment 300, such as for example a wireless mesh local area network (LAN) 302 that may include a variety of meters or mesh devices 336, possibly including various electric utility power meters, and including at least one utility gas meter with the inventive AMR retrofit assembly 241 connected via connecting means 338. The AMR device 241 includes radio frequency transmitter and receiver for communicating with the mesh LAN 302, and that mesh LAN is adapted to communicate to the mesh gateway 304, which may in turn communicate with a wide area network (WAN) 306. WAN 306 is adapted to communicate with server 310 that may include or be coupled with a data warehouse 313 and one or more data servers 314 as well as one or more application servers 312.

It may also be appreciated that embodiments of the invention have been described relative to gas utility meter retrofit, but that the invention need not be so limited and may advantageously be applied to other meters or system where a rotating dial or shaft may be adapted to have a moving index position sensed by a sensor in conjunction with a magnet or magnetic circuit moving with the index or shaft. The principles of the invention may for example also be applied to water meters having mechanical rotating dials and pointers even though the form factor of the water meter cover and/or of other mechanical features may change.

Figure 20:
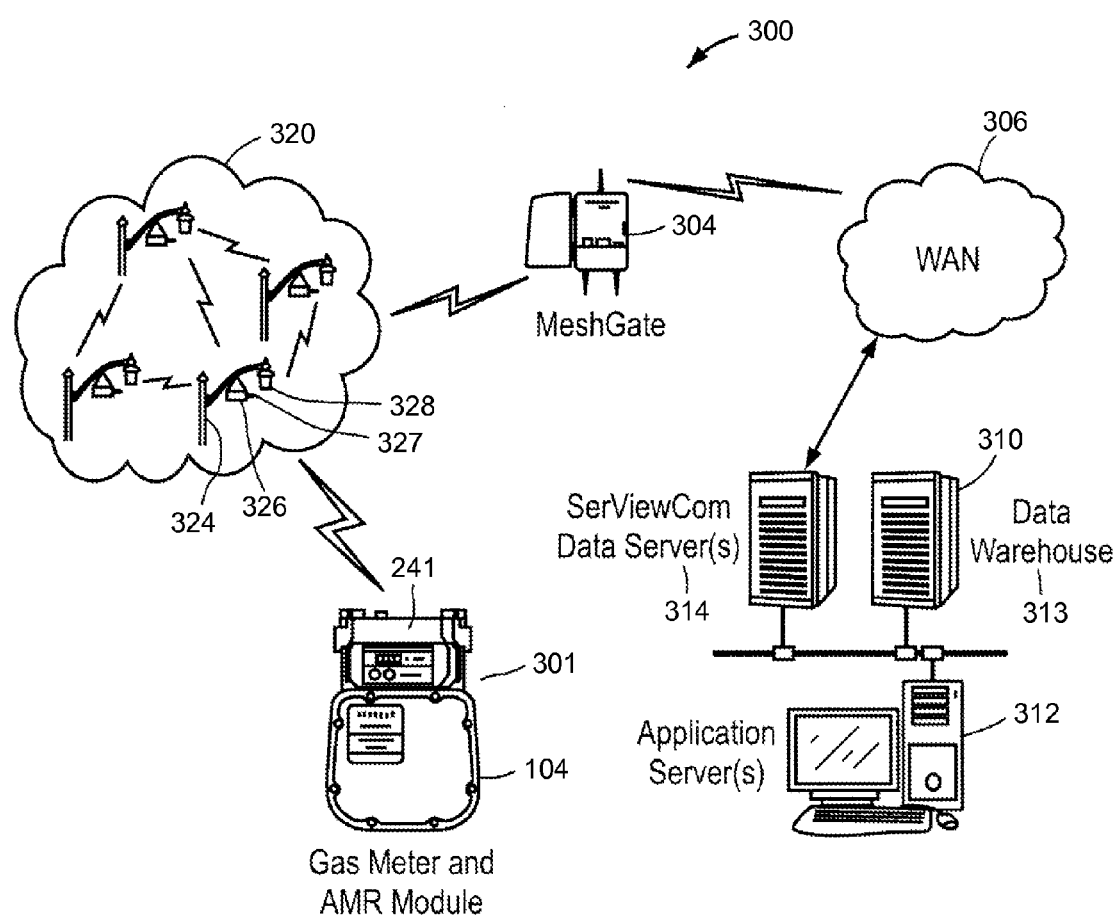
FIG. 20 is an illustration showing an alternative exemplary AMI meter reading and control system including AMI retrofitted gas meters according to embodiments of the invention.

In the non-limiting but exemplary embodiment of FIG. 20, electric power utility meters are provided with or retrofitted with reader devices that automatically form a radio-frequency (RF) mesh network such as the mesh LAN 320. A mesh gateway node on the LAN operates as a data concentrator device that collects data from all of the meters (including AMR retrofitted gas meters, AMR retrofitted water meters, and electric meters which may themselves have a different retrofit for AMR) that are present on the network. The mesh gateway device has a wide area network (WAN) connection that enables the device to upload all meter data to the system's head-end system (at the back office), in this case a data collection system.

The inventive retrofitted AMR meter is advantageously battery powered as there may normally be no electric power service into the conventional gas meter, so its normal mode of operation is to simply accumulate pulses from the magnetic sensors and electronics retrofitted onto the gas meter. Furthermore, it may usually be inadvisable to connect 120-240 line voltage to a device through which an explosive gas is transported. In most installations, the gas meter AMR module will power up its radio frequency LAN interface once a day (or according to other schedule or event driven behavior) and upload its data to the mesh gateway device with which it is associated by way of the wireless mesh LAN formed by retrofitted AMR meters. During this daily interchange, the retrofitted gas AMR meter can also receive any new operating instructions for the next operating period. Additionally, the retrofitted AMR meter can also power up and report any alarms in real-time. These alarms can include different forms of meter tamper detection.

With reference to FIG. 20, it may be appreciated that in some instances a different operating AMI environment may be experienced, such as an operating environment in which the wireless mesh LAN is formed with or include mesh network repeaters rather than a more general set of mesh devices. For example, for installations where electric power meters cannot be used to form the wireless RF mesh LAN, mesh network repeaters can be used to form the wireless RF mesh LAN. An example of this environment would be a gas only utility where, for example, a service contract is in place with a gas utility company but not with the electric utility company so that the electric meter mesh devices (such as AMR retrofitted electric meters) cannot be integrated with the gas metering system. In this environment, separate receivers 326 and transmitters 327 may be deployed in the gas meter operating environment, such as on street lamp poles 324 where there is an existing source of electricity from the electric lamps 328, as well as a good high and generally unobscured location from which to receive and transmit signals to and from the gas meter AMR device and mesh gateway device which may then readily communicate with the WAN 306.

Although the above embodiments have been discussed with reference to specific example embodiments, it will be evident that the various modification, combinations and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather a restrictive sense.

What is claimed is:

1. A method for retrofitting a mechanical meter having a meter shaft driven dial assembly comprising at least one index dial pointer and an index cover having a transparent portion for observing the index dial pointer, the method comprising:
    removing the index cover to permit access to the index dial pointer;
    attaching a magnet to the index dial pointer so that it is carried in an orbit around a dial pointer shaft to which the index dial pointer is attached; and
    mounting a replacement index cover having a sensor disposed therein or on a surface thereof to the meter, the sensor when installed being adapted to sense the passage of the index dial pointer mounted magnet and to detect at least a partial orbit of the index dial pointer;
    wherein the attaching of the magnet and the mounting of the sensor are performed without removing the meter shaft driven dial assembly from the meter.

2. The method according to claim 1, wherein the magnet is attached to the index dial pointer using a cap or fitment that slips over or snaps onto the existing index dial pointer.

3. The method according to claim 1, wherein the sensor is adapted to interact with the magnet to sense a transient passing presence of the magnet and to alter an electrical characteristic so as to indicate a rotation or partial rotation of the index dial pointer.

4. The method according to claim 1, wherein said removing the index cover, attaching the magnet, and mounting the sensor are performed without stopping gas flow through the meter and while the meter is in normal operation.

5. The method according to claim 1, wherein the magnet is attached to the index dial pointer without removing an index from the meter.

6. The method according to claim 1, wherein the magnet is held by a magnet holder cap and the magnet holder cap is attached to the index dial pointer by placing the holder cap onto the index dial pointer without removing an index from the meter.

7. The method according to claim 1, further comprising mounting the sensor to the replacement index cover.

8. The method according to claim 1, wherein the detection of at least a partial orbit of the index dial pointer comprises detecting each full orbit of the index dial pointer.

9. The method according to claim 1, wherein the meter is a gas meter.

10. The method according to claim 1, wherein the meter is a water meter.

11. The method according to claim 1, wherein the meter is an electric meter.

12. The method according to claim 1, wherein the meter is a utility meter and the index dial pointer indicates the flow of a utility commodity through the meter, and wherein
    the magnet is held to the at least one index dial pointer at a non-zero radial distance from the dial pointer shaft so that the magnet orbits the dial pointer shaft in operation as the utility commodity flows through the meter;
    the sensor is adapted to detect the passage of the magnet past the sensor on each orbit during operation; and
    the sensor comprises a circuit that receives an input signal from the sensor and develops a count related to the number of times the sensor has detected the passage of the magnet.

13. An automatic meter reading (AMR) module for a utility meter having an index assembly with at least one index dial and at least one index dial pointer that rotates about an index pointer shaft to indicate the flow of a utility commodity through the meter, the AMR module comprising:
    an index cover at least a portion of which is transparent;
    a carrier for holding a magnet to the at least one index dial pointer at a non-zero radial distance from the index pointer shaft so that the magnet orbits the index pointer shaft in operation as the utility commodity flows through the meter;
    a sensor disposed within or on a surface of the index cover, the sensor adapted to detect a passage of the magnet past the sensor on each orbit during operation; and
    a sensor circuit that receives an input signal from the sensor and develops a count related to a number of times the sensor has detected the passage of the magnet past the sensor,
    wherein the AMR is adapted to be attached to the utility meter without removing the index assembly from the utility meter.

14. The AMR module as in claim 13, wherein the sensor includes a switch that undergoes at least a transient state change during the passage of the magnet past the sensor.

15. The AMR module as in claim 14, wherein the at least a transient state change comprises a change from a switch open state to a switch closed state.

16. The AMR module as in claim 14, wherein the at least a transient state change generates a pulse signal that is detected by the sensor circuit and is used to develop the count.

17. The AMR module as in claim 14, wherein at least a transient state change during the passage of the magnet past the sensor comprises a state change until a next passage of the magnet.

18. The AMR module as in claim 13, wherein the sensor circuit further includes a memory or register for storing the count or at least one value or symbol representing the count.

19. The AMR module as in claim 13, wherein the sensor circuit further comprises:
    a low-pass filter coupled to the sensor; and
    a latch coupled to the low-pass filter.

20. The AMR module as in claim 13, further comprising a radio frequency transmitter and receiver; wherein at least the transmitter is adapted to access a memory or register storing the count or at least one value or symbol representing the count and to transmit the count or at least one value or symbol representing the count to an external entity.

21. The AMR module as in claim 20, wherein the transmitter and receiver are adapted for operation on a radio frequency wireless network.

22. The AMR module as in claim 20, further comprising an energy consumption control circuit to control the power or energy consumption of at least one of the sensor circuit, radio transmitter, radio receiver, memory, and any combination of two or more of these.

23. The AMR module as in claim 20, wherein the radio frequency transmitter and receiver are disposed within an electronics module housing different from the index cover.

24. The AMR module as in claim 13, further comprising a cap or fitment for attachment to the index dial pointer and to carry the magnet along a radius of the index dial pointer.

25. The AMR module as in claim 13, further comprising an electronics module housing different from the index cover, the sensor circuit being disposed at least in part within the electronics module housing and the sensor being disposed at least in part within the index cover; and the sensor being electrically coupled with the sensor circuit by electrical conductors.

26. The AMR module as in claim 13, wherein the sensor includes a switch that undergoes at least a transient state change during the passage of the magnet past the sensor; and the switch is disposed within a portion of the sensor circuit disposed on or within the index cover.

27. The AMR module as in claim 13, wherein:
the sensor includes a switch that undergoes at least a transient state change during the passage of the magnet past the sensor;
the at least a transient state change comprises a change from a switch open state to a switch closed state;
the at least a transient state change generates a pulse signal that is detected by the sensor circuit and is used to develop the count;

the sensor circuit further includes a memory or register for storing the count or at least one value or symbol representing the count; and the AMR module further comprises:
a radio frequency transmitter and radio frequency receiver, wherein at least the transmitter is adapted to access the memory or register storing the count or at least one value or symbol representing the count and to transmit the count or at least one value or symbol representing the count to an external entity, and the radio frequency transmitter and radio frequency receiver are adapted for operation on a radio frequency wireless network;
an energy consumption control circuit to control a power or energy consumption of at least one of the sensor circuit, radio transmitter, radio receiver, memory, and any combination of two or more of these; and
an electronics module housing different from the index cover, the sensor circuit being disposed at least in part within the electronics module housing and the sensor being disposed at least in part within the index cover, the sensor being electrically coupled with the sensor circuit by electrical conductors, and a radio frequency antenna coupled with the transmitter and receiver disposed in the electronics module housing at a location other than sandwiched between a meter body and the index assembly.

* * * * *